United States Patent [19]

Novas

[11] Patent Number: 5,023,906
[45] Date of Patent: Jun. 11, 1991

[54] METHOD FOR MONITORING TELEPHONE CALL PROGRESS

[75] Inventor: Robert G. Novas, Rockville, Md.

[73] Assignee: The Telephone Connection, Rockville, Md.

[21] Appl. No.: 513,857

[22] Filed: Apr. 24, 1990

[51] Int. Cl.⁵ .................... H04M 11/00; H04M 1/26
[52] U.S. Cl. ................................ 379/372; 379/386; 379/457
[58] Field of Search ............... 379/112, 372, 386, 418, 379/457

[56] References Cited

U.S. PATENT DOCUMENTS

| | | | |
|---|---|---|---|
| 4,405,833 | 9/1983 | Cave et al. | 179/1 MN |
| 4,439,639 | 3/1984 | Munter | 179/84 |
| 4,686,699 | 8/1987 | Wilkie | 379/93 |
| 4,924,493 | 5/1990 | Dang et al. | 379/372 |

OTHER PUBLICATIONS

Signetics Linear Products, "NE5900 Call Progress Decoder Product Specification", May 8, 1986, pp. 6-3 to 6-9.

*Primary Examiner*—Stafford D. Schreyer
*Attorney, Agent, or Firm*—Fleit, Jacobson, Cohn, Price, Holman & Stern

[57] ABSTRACT

A call progress monitor and algorithm for placing a phone call over the phone lines. The algorithm is hierarchically arranged having three major routines or portions: tone detection, signal recognition and situation recognition. Based upon the definitions stored in a memory and the commands, the call progress monitor algorithm is applied to the telephone audio data. The call progress monitor algorithm is controlled by a host computer which sends a Recognize Situation Command and expects to receive some time later, a Recognize Command Termination Report. The tone detection portion of the algorithm measures the power at each of a predetermined number of frequencies of interest. The signal recognition portion of the algorithm detects the presence of a particular signal. A signal is a particular tone or set of tones that are uniquely present (while all other tones are absent). Furthermore, a signal has qualifying requirements of signal to noise ratio (SNR), twist, and noise variance, that must be met to define a particular signal. The situation recognition portion of the algorithm determines that a certain sequence or pattern of signals has occurred with a particular timing or cadence. When a match to a particular desired condition specified in a situation definition is made, a success is reported in the Recognize Command Termination Report. Otherwise, a failure is reported, together with the condition detected which elicited the failure response.

37 Claims, 10 Drawing Sheets

FIG. 4
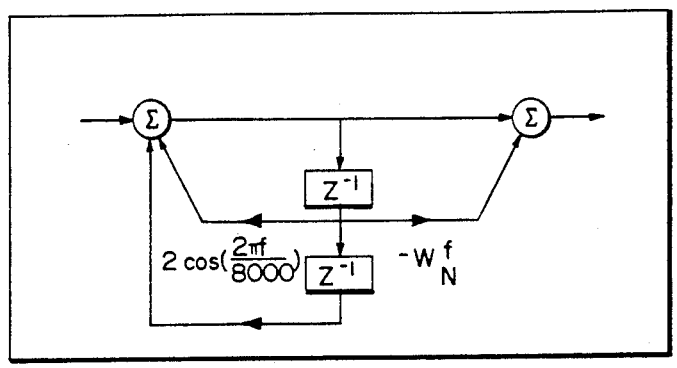
FIG. 5
IIR FILTER SECTION SIGNAL FLOW
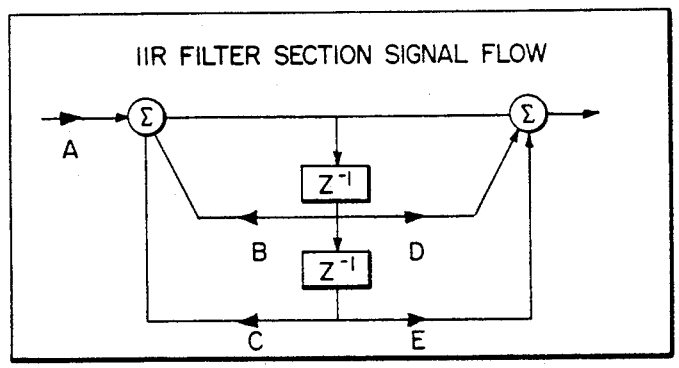
FIG. 6
| CUSTOMER IRREGULARITY PATTERN | 913.8Hz 0.274s | 1370.6Hz 0.274s | 1776.7Hz 0.380s |
SIGNAL MELD LIST: 913.8Hz 0.265s | 1370.6Hz 0.240s | 1776.7Hz 0.355s  ⇐ INPUT
| PATTERN-INPUT SIGNAL MATCHES | 913.8Hz 0.265s | 1370.6Hz 0.240s | 1776.7Hz 0.355s |
$$\text{MEASURE OF FIT} = \frac{\Sigma\, T\, \text{MATCH}_i}{\Sigma\, T\, \text{PATTERN}_i} = \frac{0.265 + 0.240 + 0.355}{0.274 + 0.274 + 0.380} = 0.926$$

METHOD FOR MONITORING TELEPHONE CALL PROGRESS

BACKGROUND OF THE INVENTION

The present invention relates to a system for allowing a computer to place a phone call and more particularly to a system for monitoring telephone call progress of a computer or other similar device.

For a person to place a phone call, it is necessary to pickup the phone handset, listen for a dial tone, and dial a telephone number. Subsequently, the person listens for a ringback signal followed by a click as the called party picks up the phone and announces their presence on the line.

During the calling procedure, a person can easily listen for and distinguish between the various call progress signals such as dial tone, ringing and busy signals. While a human can easily distinguish these various signals, it is not a trivial task for a computer. Particularly, conventional telephone systems were not developed with computer interfacing in mind. In addition, different telephone utilities have different signalling standards.

Consequently, there is a need for a system to assist and monitor a computer to place a phone call over conventional telephone systems. Specifically, a system is needed that can recognize and distinguish the various call progress signals and special information signals, for example, which tell the caller that a particular telephone number is not in service.

Several call progress systems are known. See for example U.S. Pat. No. 4,405,833 which discloses the measuring of the period of a beat frequency formed by two call progress tones. See also U.S. Pat. Nos. 4,439,639 and 4,686,699 which disclose call progress systems that measure amplitude and count the zero crossing of signals, and uses a single bandpass filter and slews the output thereof over the frequencies of interest, respectively.

These prior devices all are extremely error-prone because they rely on secondary characteristics of the telephone call progress signals. Furthermore, the prior devices do not detect the full range of signals that may occur. The present invention, on the other hand, distinguishes every call progress signal in common use in the United States as a unique combination of energy at particular tone frequencies, together with the sequence and cadence of the tone frequencies. The system according to the present invention also detects call progress signals solely by their cadence, ignoring their frequency, to allow for the detection of extremely noisy call progress signals.

SUMMARY OF THE INVENTION

It is a primary object of the present invention to provide a system and method for assisting and monitoring the call progress of a phone call made by an automated device, such as a computer.

It is another object of the present invention to provide a system and method for monitoring the progress of outgoing phone calls placed by an automated device, by detecting the power level and cadence of audible call progress signals.

The call progress monitor method according to the present invention is embodied as a computer algorithm run on a digital signal processor (DSP) or high powered personal computer. The algorithm is hierarchically arranged having three major routines or portions: tone detection, signal recognition and situation recognition.

The machine running the call progress monitor algorithm is interfaced with telephone audio data and also receives as input certain commands and preset definitions. Based upon the definitions stored in a memory and the commands, the call progress monitor algorithm is applied to the telephone audio data.

Specifically, the call progress monitor algorithm is controlled by a host computer which sends a Recognize Situation Command and expects to receive some time later, a Recognize Command Termination Report. Thus the call progress monitor is commanded to recognize a situation, applies the call progress monitor algorithm to the telephone audio data and replies with a Recognize Command Termination Report based upon the results obtained by the algorithm. In addition, the algorithm also can report in intermediate event reports which ar intermediate recognition milestones.

Briefly, the tone detection portion of the algorithm measures the power at each of a predetermined number of frequencies of interest. The signal recognition portion of the algorithm detects the presence of a particular signal. A signal is a particular tone or set of tones that are uniquely present (while all other tones are absent). Furthermore, a signal has qualifying requirements of signal to noise ratio (SNR), twist, and noise variance, that must be met to define a particular signal. The situation recognition portion of the algorithm determines that a certain sequence or pattern of signals has occurred with a particular timing or cadence.

The tone detection portion of the call progress monitor algorithm is run for every telephone audio sample received by the algorithm and produces an output every Epoch. An Epoch is a processing time interval selected on the basis of a number of tradeoffs. In the present invention, an Epoch is 200 samples or 25 milliseconds long.

Tone detection includes the step of decompressing the telephone audio data (already supplied in digital format) to a 32-bit floating point number, determining the power at a predetermined number of frequencies of interest using a digital filtering routine (via a modified Goertzel algorithm), estimating the total power of the telephone audio data, and normalizing the power at each of the frequencies of interest relative to unity. Like all of the steps in the call progress monitor algorithm of the present invention, each of the steps in the tone detection portion of the algorithm are implemented by computer code executed in a DSP.

The tone detection portion of the algorithm generates as output a normalized tone power vector which is a vector having components corresponding to the normalized power at each of the predetermined frequencies, a normalized tone reference power indicating the total power over all of the predetermined frequencies, and the total power of the incoming telephone audio data.

The signal recognition portion of the call progress monitor algorithm is also run for every Epoch and accepts the output of the tone detection portion of the algorithm to produce, as an output, the name of the signal that best matches the input data. Consequently, the signal recognition portion also receives as input signal definitions corresponding to the name of the signals that can possibly be recognized.

Signal recognition includes a signal matching routine which compares the normalized tone power vector with each of the signal definitions and generates a signal fit vector for each comparison. A signal deciding routine takes each signal fit vector, the normalized tone reference power, and the total power of the telephone audio data, and determines the signal defined which best matches the data in the normalized tone power vector. The signal which best matches is termed a best matched signal and a measure of confidence in the determination is also generated by the signal deciding routine.

The situation recognition portion of the call progress monitor algorithm is run every Epoch for each situation to be recognized. Situation recognition comprises the steps of accumulating the results of many Epochs in a "meld list", and looking at the meld list in several ways.

A meld list is a time-ordered list of each signal recognized and its duration. The term "meld" refers to a process of combining or melding the results of adjacent Epochs in which the same signal was recognized. Thus, if the results of 100 consecutive Epochs indicate that dial tone is present, a single entry will exist in the meld list that say that dial tone was present for 2.5 seconds (there are 25 milliseconds per Epoch).

Situation recognition includes signal meld generating and power meld generating routines for generating a signal meld list and a power meld list, respectively. The signal meld list contains entries that represent the output of signal recognition. Each entry contains the name of the best matched signal output by the signal recognition portion of the algorithm, and the duration of the best matched signal. The power meld list is based on whether the estimated total power exceeds a predetermined threshold. The power meld list is used to recognize signals by their cadence, and the predetermined threshold is set to recognize a signal by its power level, even if the signal recognition portion of the algorithm fails to recognize signal by its tones.

At the end of each Epoch, a new entry is added to each of the two meld lists and situation recognition proceeds by examining each meld list based on a situation definition. Situation definitions are stored in the machine running the algorithm and are the parameters which guide the call progress monitor algorithm in analyzing the progress of a phone call. Each situation definition defines parameters to cover all possible conditions that may occur in a given situation. Specifically, a situation definition contains entries that tell the situation recognizing portion of the algorithm to examine the past and present history of the telephone audio data for detecting a simple signal, a complex pattern of simple signals, a continuing pattern of signals and the absence of a continuing pattern.

Central to the situation recognition portion of the algorithm is a situation recognizing routine which acts upon the stored situation definitions depending upon the particular situation the algorithm is running or commanded to recognize. A finite state machine monitoring routine and a complex pattern matching routine are selectively invoked by the situation recognizer depending upon the type of signals to be detected in a particular situation. The finite state machine monitoring routine and the complex pattern matching routine both examine the content of the signal meld list and the power meld list. Certain conditions defined in a situation definition trigger termination of further recognition while other conditions trigger reporting a particular event, but continue recognition.

BRIEF DESCRIPTION OF THE DRAWINGS

FIG. 4 is a diagram illustrating the signal flow of a Goertzel algorithm for performing the digital filtering in the digital filter bank/power spectrum estimator shown in FIG. 3.

FIG. 5 is a block diagram illustrating the signal flow of one section of a cascaded two section infinite impulse response low pass filter used in the voice filter/detector portion of the digital filter bank/power estimator of FIG. 3.

FIG. 6 is a block diagram illustrating the process of matching an input signal meld list with a stored pattern for computing a measure of fit between the input signal meld list and the stored pattern.

DETAILED DESCRIPTION OF THE DRAWINGS

OVERVIEW OF THE CALL PROGRESS MONITOR

Figure 1:
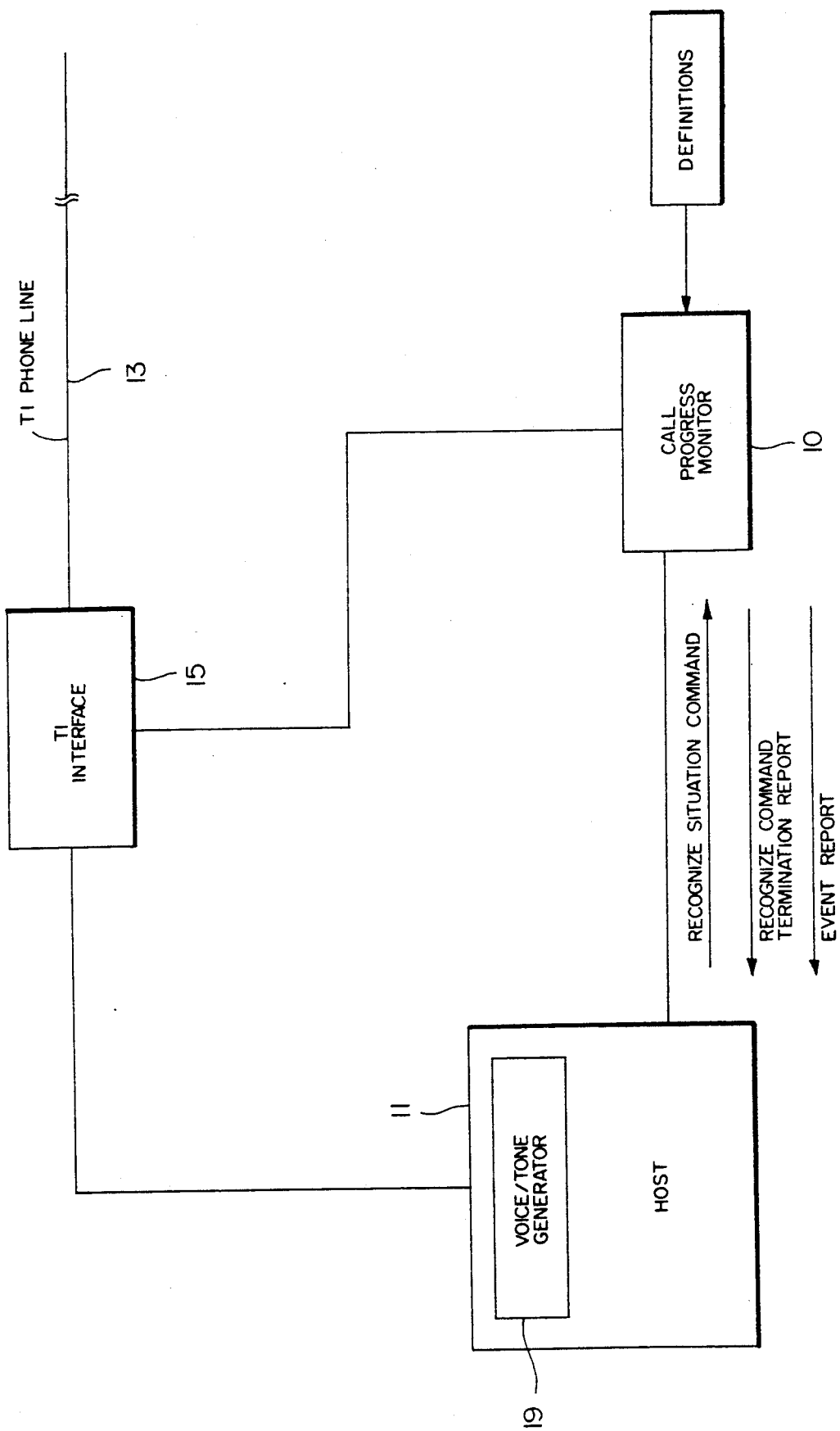
FIG. 1 is a block diagram illustrating the call progress monitor according to the present invention in its functional environment.

Referring first to FIG. 1, the call progress monitor according to the present invention is generally shown at 10. The call progress monitor 10 receives as input telephone audio data and based upon certain definitions stored in a memory, applies a call progress monitor algorithm directed by the various definitions to the telephone input audio data. The monitor 10 is commanded to recognize a situation and applies the call progress monitor algorithm to the telephone input audio data and replies with a recognized command and/or a termination report based upon the results obtained by the algorithm. In addition, the algorithm also can report in intermediate event reports which are intermediate recognition milestones.

The call progress monitor 10 is designed to be used with a T1 digital telephone system. As is well known in the art, T1 is a digital transmission link with an information capacity of 1.544 Megabits per second using a pair of normal twisted wires. A T1 system, shown at 13 in FIG. 1, accommodates 24 channels or time slots of 8 bits each. Consequently, 24 simultaneous and distinct channels of information or voice conversations can be carried by a single T1 transmission line. The 8 bits for each channel is obtained by a compander and pulse code modulation (PCM) analog-to-digital converter, which are well known in the art. Each 8 bits of information per channel is assigned a particular time slot and the 24 channels are transmitted over the line by a technique known as time division multiplexing.

The call progress monitor 10 of the present invention is capable of processing 24 channels of data. This means that the call progress monitor can process 24 calls or one T1 telephone line. Likewise, the host 11 is capable of interacting with the T1 phone line 13 and handling up to 24 different phone calls or conversations.

In this regard, a T1 interface unit 15 is provided to interface the data on the T1 phone line with the call progress monitor 10 and the host 11. Such an interface unit comprises parts sold commercially, for example, under the name CS2180A T1 Transceiver and CS61574 PCM Line Interface by Crystal Semiconductor Corporation. The interface unit 15 performs the multiplexing and demultiplexing functions for the host 11 and call progress monitor 10 so that particular individual channels of data on the T1 phone line 13 can be processed. To create condition of "off-hook" in the context of the T1 digital system, a bit in each channel is provided for indicating the "off-hook" condition. Particularly, this bit is termed a signalling bit and may be "stolen" from one of the 8 bits in the channel, as is well known in the art, or may simply be added as a separate bit to each channel. Thus, the "offhook" condition is created by setting the signalling bit to a particular value. This is accomplished by the T1 interface unit 15. The central office of the public telephone company detects this bit change in the particular channel, and in response provides a dialtone signal on that particular channel. The dialtone signal, like all signals transmitted over the T1 line, is companded and digitized by an analog-to-digital converter to 8 bit format prior to transmission over the T1 line.

The call progress monitor 10 is used in conjunction with a host machine 11, such as a microprocessor or computer. The host 11 issues Recognize Situation Commands to the call progress monitor 10 and receives Recognize Command Termination Reports (and possibly Event Reports) generated by the algorithm implemented by the call progress monitor 10. The host 11 includes a voice/tone generator 19 for generating the tones necessary for dialing a telephone number and also for communicating preset voice messages to a person waiting to be connected to another person who is being dialed by the host, as will be explained in more detail hereinafter.

For example, to out-dial on a phone line 13, a software algorithm in the host 11 interacts with the off hook unit 17 of the T1 interface 15 and places a particular channel in the T1 phone line 13 "off-hook", and subsequently commands the call progress monitor 1 to recognize dialtone (or its absence). The call progress monitor 10 monitors the signal activity on that particular channel on the T1 phone line and notifies the host algorithm of the presence or absence of dialtone by means of a Recognize Command Termination Report. If the call progress monitor 10 reports the presence of dialtone, the voice/tone generator 19 of the host 11 dials the desired phone number, typically by placing Dual Tone Multiple Frequency (DTMF) signals on the line. The host algorithm then commands the call progress monitor to recognize the outcome of the phone call. One possibility is that the phone is picked up and answered. Other possibilities include a busy signal, or a ringing signal with no answer. These outcomes are also reported to the host by the call progress monitor in a Recognize Command Termination Report. If the outcome is that a voice is detected followed by a preset period of silence, the call progress monitor 10 notifies the host 11, so that the host can put speech on the channel at the appropriate time or connect a waiting person to that particular channel.

It is to be understood, that when the term phone line is mentioned hereinafter, it is to include a particular channel on a T1 digital phone line, as well as a conventional analog phone line.

The term situation is central to the operation and understanding of the call progress monitor according to the present invention. A situation is a sequence of particular signals which are indicative of a particular step in a sequence of steps for placing a telephone call. For example, one situation could be to listen for a dialtone and acknowledge the detection of a dialtone, but if anything out of the ordinary is heard, also acknowledge the occurrence of such extraordinary signals.

In its most simplified form, placing a call typically uses two situations. The first situation is to recognize the presence of a dialtone on a telephone line. This situation is performed when a phone line is first picked up since a phone call should not be dialed unless there is a dial tone on the line. When the call progress monitor is initiated by a recognize dialtone situation command to recognize the presence of dial tone, the recognized dial tone situation terminates with a success status when dial tone is detected and terminates with a fail status if dial tone is not detected within a predetermined period of time (or if any other signal is detected).

The second situation is to recognize phone pickup. In this case, when the call progress monitor is initiated by a recognize situation command to recognize phone pickup, the situation terminates with a success status when voice is detected followed by silence. For example, if the party answering the phone call says "Hello?", the situation terminates a short time after the end of the "Hello" utterance. Studies have shown that residential phones are typically answered with a 0.5-2 second utterance; business phones answered with a 2-5 second utterance; and answering machines answered with a 5-15 second announcement.

The second situation detects and measures the voice duration (up to a significant pause) to allow each type of answering party/line to be distinguished. The second situation terminates with a fail status if a busy signal or a special information signal is recognized. Furthermore, the type of signal causing the fail termination is identified. The situation also terminates with a fail status if ringing is not detected to be present if, for example prior to pickup, the phone line has gone dead.

The above described situation definitions are typical examples. The call progress monitor algorithm according to the present invention accepts definitions of various kinds as data so that modifications can be made to the definitions without requiring change in the algorithm.

Figure 2:
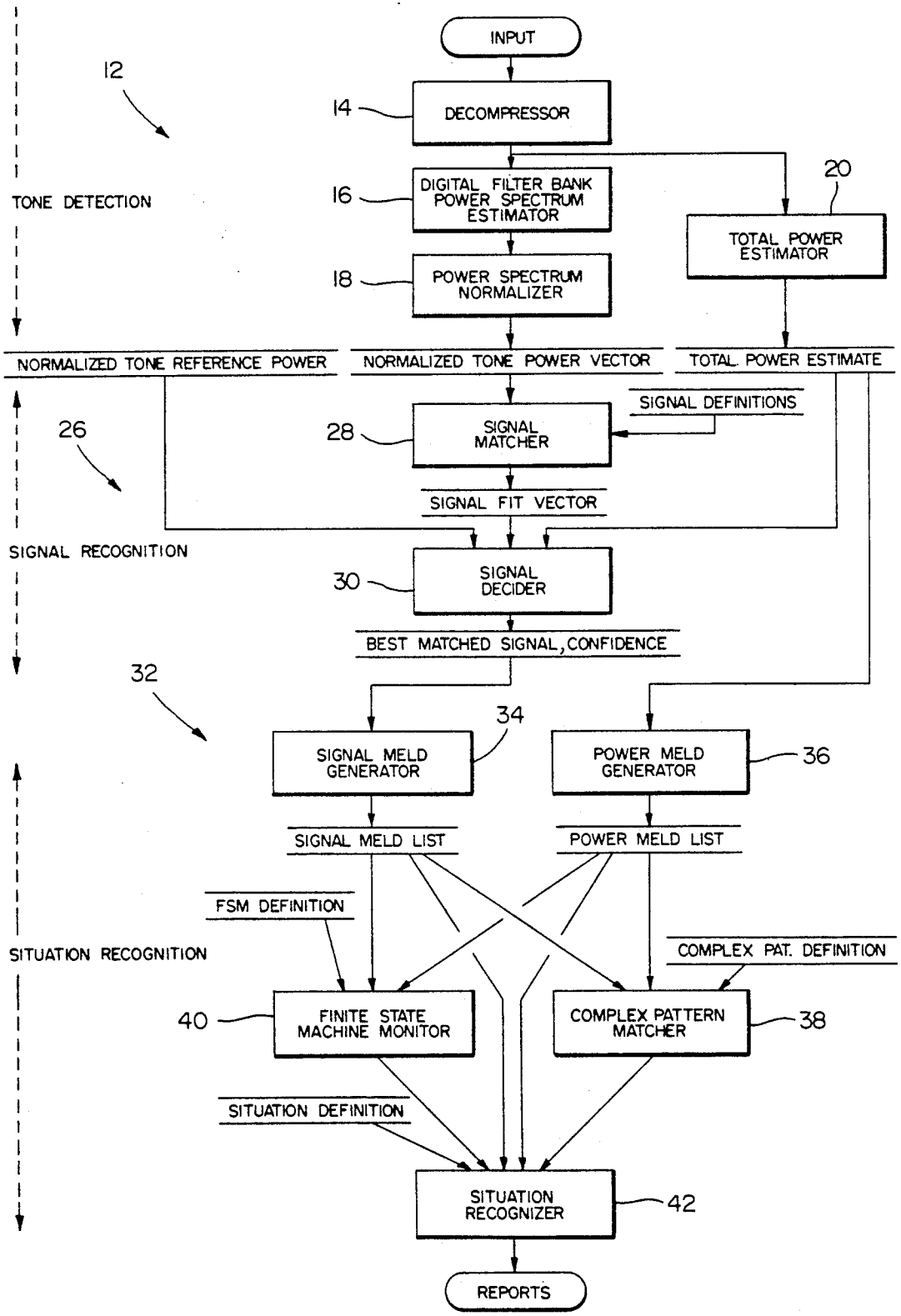
FIG. 2 is a flow chart illustrating the signal flow of the call progress monitor algorithm according to the present invention.

The signal flow through the call progress monitor algorithm is shown in detail in FIG. 2. The algorithm is hierarchically arranged having three major layers: tone detection, signal recognition and situation recognition. The algorithm shown in FIG. 2 is performed by software and can be implemented in a conventional but powerful personal computer or more preferably in a digital signal processor such as the DSP-32C Processor by AT&T. Furthermore, data required for and generated during implementation of the algorithm is stored in a memory forming a part of the call progress monitor.

Briefly, the tone detection portion of the algorithm measures the power present at each of a predetermined number of frequencies of interest. The signal recognition portion of the algorithm detects the presence of a particular signal. A signal is a particular tone or set of tones that are uniquely present (while all other tones are absent). Furthermore, a signal has qualifying requirements of signal to noise ratio (SNR), twist, and noise variance, that must be met to define a particular signal. The situation recognition of the algorithm determines that a certain sequence or pattern of signals has occurred with a particular timing or cadence.

As mentioned above, the call progress monitor 10 is embodied as a computer program containing code and data that execute in a digital signal processor (DSP) such as the AT&T DSP32C. A single DSP-32C running at 50 MHz with 32K 32-bit words of zero-wait state memory can execute the call progress monitor algorithm on 24 channels of pulse code modulated (PCM) data simultaneously. Consequently, a typical T1 type digital telephony channel provided by a telephone service which comprises 24 channels, can be processed by a single DSP-32C.

TONE DETECTION

The tone detection portion of the call progress monitor algorithm is run for every audio sample input by the algorithm. The tone detection portion of the algorithm produces an output every Epoch. An Epoch is a processing time interval selected on the basis of a number of tradeoffs. In the present invention, an Epoch is 200 samples or 25 milliseconds long. As a result, fast recognition response time is achieved. Furthermore, as will be explained in more detail hereinafter in consequence of a 25 millisecond Epoch, the positions of the zeros of the digital filters in the digital filter bank are arranged every 40 Hz, and selected so that the two closest frequencies measured (440 Hz and 480 Hz) have minimum interaction.

The tone detection portion of the algorithm, generally shown at 12, comprises a decompressing step 14, a digital filter and power spectrum estimating step 16, a power spectrum normalizing step 18 and a total power estimating step 20. Each of the steps 14–20 in the tone detection portion of the algorithm are implemented by computer code executed in a DSP. The decompressing step 14 converts data in 8-bit PCM-coded compressed format (transmitted on a channel of a T1 phone line) to 32-bit floating point format data that is uncompressed for processing. The decompressing step 14 is required because it is envisioned that the call progress monitor 10 will be used with a T1 digital phone system which provides 8-bit PCM-coded and compressed data. Should some other means be provided for supplying an audio sample input that is already in 32-bit floating point format, the decompressing step 14 would not be required. Specifically, should conventional audio data be transmitted on a conventional analog phone line, a analog-to-digital converting step producing 32-bit floating point data representing the analog data, would replace the decompressing step 14.

As is well known in the art, it is possible that different types of data format may be supplied to the decompressing step 14. As such, the decompressor is implemented by a DSP-32C instruction that converts 8-bit PCM data which is either u-LAW compressed (North American and Japanese standard) or A-LAW compressed (European standard) to a 32-bit floating point number which is decompressed. The decompressed data is linearly related to the original input sample voltage.

The digital filter bank and power spectrum estimator 16 measure the energy present in the input signal at a predetermined number of frequencies of interest. These frequencies are selected to correspond to the signals that are being recognized by the situation that is running.

Figure 3:
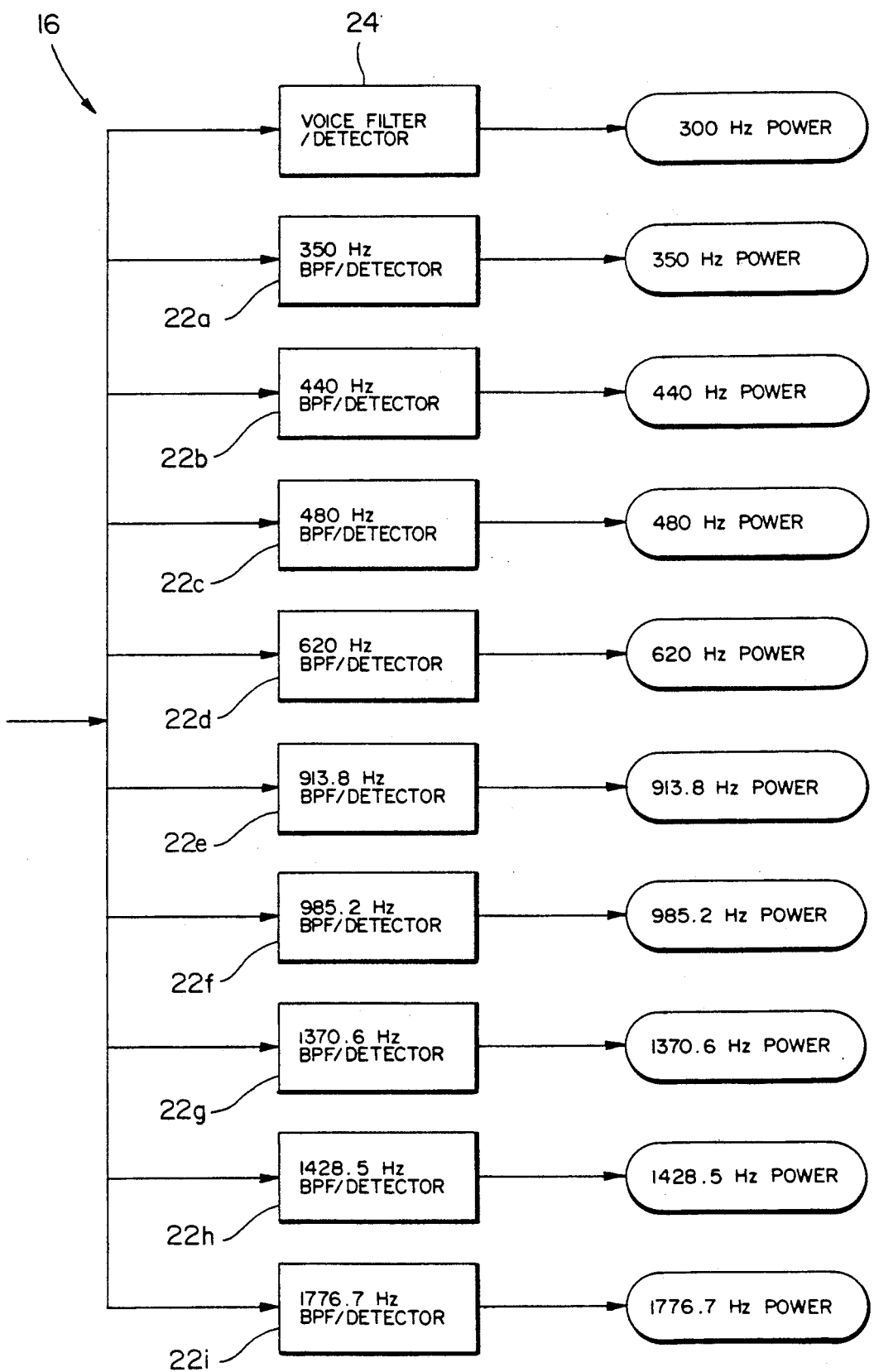
FIG. 3 is a block diagram illustrating the digital filter bank/power spectrum estimator forming a part of the call progress monitor according to the present invention.

FIGS. 3 and 4 illustrate aspects of the digital filter bank and power spectrum estimator 16 in greater detail. In FIG. 3, the digital filter bank 16 and power spectrum estimator is shown including 9 bandpass filter/detectors 22a–22i and a voice filter/detector 24. The bandpass filter/detectors 22a–22i measure the magnitude of the energy present at the nine frequencies labeled which are required to recognize the call progress signals ringing, busy, dial and special information signals.

There are 32 special information signals defined, although only five are in common use. Special information signals are generated by the Central Office of the telephone company to alert a user that a problem has occurred with a phone call. They consist of a sequence of three tones, each at a specific frequency, and with a particular cadence. They are followed by a voice announcement such as, for example, "The number you have dialed is not in service". The special information signal itself is actually intended for recognition by a machine.

The nine bandpass filter/detectors are implemented using the Goertzel algorithm for evaluating the discrete fourier transform (DFT) of the input audio data.

FIG. 4 illustrates the Goertzel algorithm implemented by the present invention in detail. The Goertzel algorithm recursively evaluates the discrete fourier transform of an input signal at a point. Because the Goertzel algorithm is recursive, it evaluates the DFT "on the fly" and does not require that the input samples be stored.

As is well known in the art, evaluating the DFT is not the only way to determine the power at frequencies of interest. There are other ways which are computationally more intense, and therefore are more difficult to use when processing 24 channels of information with a single DSP32-C DSP chip. The Goertzel algorithm was chosen primarily for its computational efficiency. It is to be understood that other means of filtering, such as Finite Impulse Response bandpass filters or Infinite Impulse Response bandpass filters can be used, and indeed, certain of these are technically preferable. However, their processing requirements are greater, and so require either processing fewer channels or the use of faster (or more) digital signal processor chips.

The Goertzel algorithm shown in FIG. 4 has been optimized for the call progress monitor algorithm of the present invention in a number of ways. The Goertzel coefficients corresponding to each of the bandpass filter/detectors 22a–22i are listed in Table A2 of the appendix. The Goertzel coefficients have been modified so as to evaluate the DFT at particular frequencies of interest, rather than frequencies that are equal to the sampling frequency k/N, where N is a sample rate and k=0,1,2, ..., N/2. In addition, only the left hand side of the Goertzel algorithm is evaluated for every sample input (8,000 samples/second). The right hand side is evaluated once every Epoch. Since the magnitude of the signals is required, but not the phase, the coefficient $W^k_n$ shown in FIG. 4 (which is the customary notation for the complex-valued valued coefficient $e^{-j2pf/N}$) reduces simply to $2\cos(2\pi f/N)$. Therefore, the Goertzel algorithm is entirely evaluated with real multiplication and addition operations. Finally, the number of samples per Epoch (200) is chosen so that a zero of the Goertzel's system function for the 440 Hz point falls at 480 Hz, and viceversa. These are the two closest frequencies measured, and therefore the interaction between these frequencies is of greatest concern. Because, as is well known in the art, a zero is a point of maximum signal rejection, the Goertzel algorithm minimizes the interaction of the 440 Hz measurement with the 480 Hz measurement.

The voice filter/detector 24 provides an indication of the presence of voice energy by detecting the energy universally present in vowels in speech. The output of this filter is use both to sense the presence of speech and to prevent "talk off". Talk off is the term for the ability of certain voices to activate the call progress signal recognizer as if a call progress signal were present.

The signal flow of one section of the cascaded two section voice filter/detector 24 is illustrated in detail in FIG. 5. The values of the coefficients are listed in Table A3 of the appendix. The voice filter/detector 24 is implemented as a 300 Hz infinite impulse response (IIR) low pass filter, followed by taking the square root of the sum of the square of the output of the filter over an Epoch. The IIR low pass filter used in the present invention is a two section filter. FIG. 5 illustrates the signal flow of a single section of this filter, while it is to be understood that two of these sections are to be cascaded. The IIR filter runs for every sample input and the sum of the squares is computed and maintained. For computational efficiency, the A coefficient is factored out and only applied once per Epoch, when the square root is taken, thereby saving one multiply per sample input.

The output of the digital filter bank and power spectrum estimator 16 is ten magnitudes corresponding to the magnitude of power at the nine frequencies interest illustrated in FIG. 3 and the magnitude of power at frequencies less than 300 Hz.

Referring back to FIG. 2, the power spectrum normalizer 18 takes the ten magnitudes output by the digital filter bank and power spectrum estimator 16 and normalizes them so that the sum of the ten values equal 1. In addition, the power spectrum normalizer 18 generates a normalized tone power vector and a normalized tone reference power quantity. The normalized tone power vector comprises ten components, each of which corresponds to one of the normalized ten magnitudes. Specifically, for illustrative purposes, the normalized tone power vector is designated PV and each component in the vector is designated 1 of $PV_1-PV_{10}$ where $PV_1-PV_{10}$ correspond to the normalized power at frequencies less than 300 Hz, 350 Hz, 440 Hz, 480 Hz, 620 Hz, 913.8 Hz, 985.2 Hz, 1370.6 Hz, 1428.5 Hz and 1776.7 Hz, respectively. The normalized tone reference power is the sum of the original and not normalized ten magnitudes at the frequencies of interest.

The total power estimator 20 produces a total power estimate by finding the square root of the sum of the squares of the samples input in an Epoch. This estimate represents an estimate of the total power, both in-band (measured by the bandpass/detectors and voice filter/detector) and out-of-band of the filters.

SIGNAL RECOGNITION

The signal recognition portion of the call progress monitor algorithm is generally shown at 26 in FIG. 2. Signal recognition is run for every Epoch. The signal recognition portion of the algorithm accepts the output of the tone detection portion of the algorithm and produces, as an output, the name of the signal that best matches the input data. Consequently, the signal recognition portion 26 receives as input signal definitions corresponding to the name of the signals that can possibly be recognized. These signals are listed in Table A1 of the appendix While only nine signals are listed (aside from silence, unknown and raw high energy), it is to be understood that many more types of signals can be defined and recognized by the call progress monitor algorithm according to the present invention, including Dual Tone Multiple Frequency (DTMF), Multiple Frequency (MF), facsimile machine and other special signals such as the coin "bong" tone used by pay phones.

Referring to Table A1 in the appendix, each line in the table includes six entries. The entry on the far left of the table is an index value assigned to the signal and the entry next to the index is the name of the signal. The entry on the far right of the table is the frequency of the tone or tones corresponding to that particular signal. The remaining entries are used to describe a particular signal and correspond to actual data that is stored in a DSP or computer as a signal definition. The parameter labeled P-vector includes 10 entries as shown. The P-vector defines which tones are required to be present and which tones are required not to be present for a particular signal to be recognized. The 10 components in each P-vector corresponds each of the ten measurements in a normalized tone power vector. To the left of the P-vector are three parameters labeled MinSig, MaxTwist, and MaxVar.

MinSig defines the minimum of the sum of the relative magnitudes of the tones that are required to be present. This parameter is used to require that at least a certain amount of energy measured be present in the tones that compose a signal.

MaxTwist defines the maximum twist allowed for a signal that contains two tones. Twist is the measure of the balance of the magnitude of the two tones, and equals the greater magnitude divided by the lessor. MaxTwist is used to ensure that the tones that compose a two tone signal are substantially equal in magnitude.

MaxVar defines the maximum variance allowed in the magnitude of the tones that are required not to be present, when considering these tones to be N independent random variables. MaxVar is used to define that the tones required not to be present be substantially equal in magnitude.

The signal recognition portion 26 of the call progress monitor algorithm comprises the two blocks labeled signal matcher 28 and signal decider 30. Like the tone detection portion of the algorithm 12, the signal matcher 28 and the signal decider 30 are performed by computer code or software subroutines. The signal matcher 28 heuristically compares the normalized tone power vector to a set of signal definitions and produces a measure of fit in terms of a signal fit vector, between the input normalized tone power vector and each signal definition. The signal decider 30 examines the signal fit vector, the normalized tone reference power generated by the power spectrum normalizer 18, and the total power estimate generated by the total power estimator 20 and decides which signal best matches the input data, and also produces a measure of confidence in this decision.

The signal matcher 28 looks for energy to be present in particular tones and absent in other tones about which it has information as made available in the signal definitions. To do this, the signal matcher 28 compares the normalized tone power vector to a set of signal definitions, listed in Table A1 and previously described. As mentioned above, the output of the signal matcher 28 is a signal fit vector. There are as many entries in this vector as there are signals defined. For the present invention, there are nine entries in this vector, one for each line in Table A1. Each entry is the measure of fit between the data input during the Epoch and the corresponding signal definition. The measure of fit equals 0 (i.e., there is no fit) if any of the following conditions is true:

If the sum of the relative magnitudes of the tones that are required to be present is less than MinSig.

If the signal being fit is a two tone signal, and if the twist (the greate magnitude divided by the lesser) is greater than MaxTwist.

If the variance of the signals that are required to not be present is greater than MaxVar.

If none of these conditions is true, the measure of fit is computed as the sum of the relative magnitudes of the tones that are required to be present divided by MinSig plus the inverse of the twist (twist is set to be 1 for a single tone signal) minus the variance. This measure is greater as the tones required to be present are greater than MinSig, the twist is closer to 1, and the variance is closer to 0.

The signal decider 30 first examines the total power estimate. If the total power estimate is less than an absolute threshold value of −50 dBm, the output of the signal matcher 28 is ignored and the signal detected is classified as silence. This prevents the algorithm from recognizing a crosstalk signal (a signal present on some other channel that "leaked" into the channel of interest). Otherwise, the signal decider 30 finds the signal with the greatest measure of fit and calls it the best matched signal. The signal decider 30 calculates a measure of confidence in this decision by dividing the measure of fit of the best matched signal by the sum of all the measures of fit. If only one signal matched with a non-zero measure of fit, which is often the case, the confidence calculated is 1. Otherwise, the confidence is the inverse of the number of signals that matched weighted by signal's measure of fit.

Table A7 in the appendix lists actual computer output of the call progress monitor algorithm when detecting the special information tone termed "IC" which includes the three special information tones SIT-1-LO, SIT-2-LO, and SIT-3 in a particular cadence or timing pattern. The essential data listed in table A7 include the normalized tone power vector "Pwr", the signal fit vector "Sig", the confidence in the match between the audio data and the parameters defined for detecting this signal, and a number which indicates the signal which best fits the data, "BestMatch".

The BestMatch parameter is the (zero-origin) index into the signal fit vector, "Sig", of the signal with the highest measure of fit. For SIT2_LO, the index value is 5. This information appears twice in each group of lines shown in Table A7; once in symbol form as SIT2_LO, and secondly as numeric form as the index value Best-Match=5. This symbol/index value relationship is defined in Table A1, where, for example, it is shown that DIALSIG has index value 0 and RINGSIG has index value 1. Specifically, BestMatch corresponds to the index of the signals as listed in the far left column in table A1. The signal, UNKNOWN, for example, has an index value of 10 in the present invention. The particular index values chosen are completely arbitrary.

Also indicated in the table is the measure of fit between the defined signals and the actual signals detected in the telephone audio data.

The data listed in Table A7 corresponds to values obtained at the end of each Epoch. As shown in the table, this special information signal begins with SIT-1-LO which corresponds to a tone at 913.8 Hz. This is indicated by the value of 0.808 in the fifth component (corresponding to a tone at 913.8 Hz) of the normalized tone power vector "Pwr" in the first entry of the table. For this special information signal, the SIT-1-LO tone should last for 0.274 seconds (referring to the second entry in table A5, described hereinafter); 0.274 seconds corresponds to approximately 11 Epochs. As expected, the SIT-2-LO tone is first detected at the eleventh Epoch and continues until through Epoch 21 since the duration for this tone is also 0.274 seconds. This is evidenced by the change in the normalized power vector "Pwr" from values near unity in the fifth component of the vector to values near unity in the seventh component of the vector. Finally, the SIT-3 tone is detected at Epoch 22 as evidenced by the value of the ninth component of the "Pwr" vector hitting 0.893 in Epoch 22.

SITUATION RECOGNITION

The situation recognition portion of the call progress monitor algorithm is generally shown at 32 in FIG. 2. The situation recognition portion 32 of the algorithm is run every Epoch for each situation to be recognized. Situation recognition comprises the steps of accumulating the results of many Epochs in a "meld list", and looking at the meld list in several ways.

A meld list is a time-ordered list of each signal recognized and its duration. The term "meld" refers to a process of combining or melding the results of adjacent Epochs in which the same signal was recognized. Thus, if the results of 100 consecutive Epochs indicate that dial tone is present, a single entry will exist in the meld list that says that dial tone was present for 2.5 seconds (there are 25 milliseconds per Epoch).

The situation recognition portion 32 of the algorithm includes a signal meld generator 34 and a power meld generator 36 for generating a signal meld list and a power meld list, respectively. The signal meld list contains entries that represent the output of signal recognition. Each entry of the signal meld list contains the name of the best matched signal output by the signal recognition portion 26 of the algorithm, and the duration of the best matched signal. The power meld list is based on whether the estimated total power exceeds a predetermined threshold. The power meld list is used to recognize signals by their cadence, and the predetermined threshold is set to recognize a signal by its power level, even if the signal recognition portion 26 of the algorithm fails to recognize a signal by its tones.

For example, certain older phones systems such as ones in northern New England, generate ringing and busy signals that are completely unrecognizable except by the cadence of a raucous noise replacing actual ringing or busy signals. By using both frequency and energy level information, the call progress monitoring algorithm of the present invention can detect call progress signals on newer and older phone systems.

At the end of each Epoch, a new entry is added to each of the two meld lists and situation recognition proceeds by examining each meld list based on a situation definition. A situation definition contains entries that tell the situation recognizing portion 32 to examine the past and present history of the telephone audio data for detecting a simple signal, a complex pattern, a continuing pattern and the absence of a continuing pattern. Table A4 in the appendix lists the various situations defined in the call progress monitor algorithm according to the present invention. While only two situations are listed (labeled Situation 1 and Situation 2), it is to be understood that additional situations can be defined depending upon the particular application without deviating from the scope and spirit of the present invention.

Referring again to the situation definitions in Table A4, a simple signal is recognized as the presence of a single signal for a given duration. An example of the recognition of a simple signal is when initiating a phone call and looking for the presence of a dial tone for approximately 0.1 seconds, for example, before dialing the number. Another example is when a phone number has been dialed and it is necessary to recognize the presence of a busy signal. A simple signal entry contains a meld list ID, a signal ID, a duration and a flag. The meld list ID indicates which meld list to look for the signal ID. For example, in situation 1 listed in Table A4, the first entry is a simple signal entry for recognizing dialtone. The first parameter listed for this entry is the flag which for this entry is "1", which will be explained in more detail hereinafter. The next parameter is the signal ID, which for this entry is DIALTONE The third parameter listed is the meld list ID which is the signal meld list as indicated by the entry SIGLIST. This indicates that the signal meld list should be examined to detect his signal. The final entry is the duration of the simple signal which for this entry is 0.50 seconds.

If the most current entry in that particular meld list indicates that the signal ID has been present for at least the noted duration, then the situation recognizer 32 declares a simple signal match and terminates. The value under the column labeled flag corresponds to a value provided in a termination report. The flag typically identifies which signal was recognized.

A complex pattern is the occurrence of a sequence of signals with a particular timing. An example of the recognition of a complex pattern is when a phone number has been dialed and it is necessary to recognize the occurrence of a special information signal. A special information signal is typically the occurrence of three simple signals in a particular order, each simple signal having a particular frequency and duration, that notifies the dialer that some network or some dialing error has occurred. A special information signal is followed by a voice announcement. The special information signal itself is actually intended for recognition by a machine.

A complex pattern entry contains a complex pattern definition ID and a flag. See for example situation 2 in Table A4 in which the sixth entry is a complex pattern. The first parameter listed for this entry is a flag having a value of $-3$. The next parameter listed is the complex pattern definition I which for this entry is "WEIRD_BUSY". The situation recognizer invokes the complex pattern matcher, labeled 38 in FIG. 2, and passes it the complex pattern definition ID. If the complex pattern matcher 38 determines that the complex pattern matches the data in the meld list, examining the list from the most recently input data to the oldest input data, then the situation recognizer 32 declares a complex pattern match and terminates. The flag contains a value $(-5)$ to provide in a termination report and identifies which complex pattern was recognized.

Table A5 lists the complex patterns which are recognized by the call progress monitor algorithm according to the present invention. Nine complex patterns are listed in table A5 although others may be added depending on the particular application of the call progress monitor algorithm. These complex patterns are stored in the DSP or computer as complex pattern definitions. The first six entries in Table A5 are complex patterns corresponding to special information tone signals. The last three entries in the table are complex patterns corresponding to various types of busy signals.

For example, referring to the third entry in the table termed a "special info tone VC", the signals associated with this complex pattern are listed. Specifically, to match the complex pattern for special info tone VC three signals must be detected. The first signal to be detected is a special information tone (SIT) signal of the SIT-1-HI type for 0.380 seconds. The second signal is a signal of a type SIT-2-LO for 0.274 seconds. Finally, the last signal in the complex pattern is a SIT-3 signal for 0.380 seconds. Note that the signals in this table are listed in the reverse order of their occurrence in time. This is because it is more computationally efficient to match a complex pattern with the meld list if the signals in the complex pattern are defined in reverse order.

A third type of entry in a situation definition is a continuing pattern. A continuing pattern is any pattern of simple signals that can be recognized by a finite state machine. An example of the use of a continuing pattern is when a phone number has been dialed and it is necessary to recognize the presence of the ringback signal (commonly called ringing). This signal is recognized as two seconds of ring signal, followed by four seconds of silence, with the pattern repeating, possibly forever.

In this regard, a finite state machine monitor 40 is provided in the situation recognition portion 32 of the algorithm. The finite state machine monitor 40 receives finite state machine (FSM) definitions as input and detects a continuing pattern. The finite state machine 40 has a current state which is one of a finite number of internal states. Each internal state has defined a finite number of state transitions which consists of a condition and a next state. When a condition of the current state is satisfied, the finite state machine monitor 40 goes to the next state of that particular condition. The finite state machine monitor 40 also has an initial and a preset number of terminal states.

The finite state machine monitor 40 also embodied as software, acts based on a finite state machine context block index and a finite state machine transition table ID as input. A finite state machine context block contains current state information about the finite state machine automata such as the current finite state machine state, the Epoch number that the current state was entered, the current signal and the Epoch number that the current signal was first found. Each time the finite state machine monitor 40 is invoked, the current signal information is updated from a meld list and two variables are calculated: time in a current state and the time in a current signal.

A finite state machine transition table contains the identity of the meld list for which the finite state machine is to run on and a list of entries. Each entry is in one of the following forms:

If the current finite state machine state is X and the current signal is S and the time in the current signal is greater than Y, then set the current finite state machine state to Z.

If the current finite state machine state is X and the time in the current state is greater than Y, then set the current finite state machine state to Z.

If the current finite state machine state is X, then generate an event report Y, and set the current finite state machine state to Z.

If the current finite state machine state is X, then set the FSM inhibit flag to Y and set the current finite state machine state to Z.

The finite state machine inhibit flag is a 1-bit flag provided for each finite state machine. If the inhibit flag is clear, then the situation recognizer runs the corresponding finite state machine. If an inhibit flag is set, then the situation recognizer inhibits the functioning of the corresponding finite state machine. Using this feature, a finite state machine can inhibit its own functioning or inhibit the functioning of another finite state machine.

Table A6 lists the transition tables, previously termed finite state machine definitions, which are used by the call progress monitor algorithm of the present invention. Also part of the finite state machine entry is a flag which can have a zero or non-zero value. The finite state machine monitor 40 can either return a non-terminal or a terminal status. If the finite state machine monitor 40 returns a non-terminal status, situation recognition continues. Otherwise, and if the flag has a non-zero value, it is declared that a finite state machine terminal state match is made and situation recognition terminates upon producing termination report that contains the flag value. If the finite state machine monitor 40 returns terminal status and the flag has a zero value, situation recognition continues since the finite state machine monitor has the ability to generate event reports independently.

Figure 10:
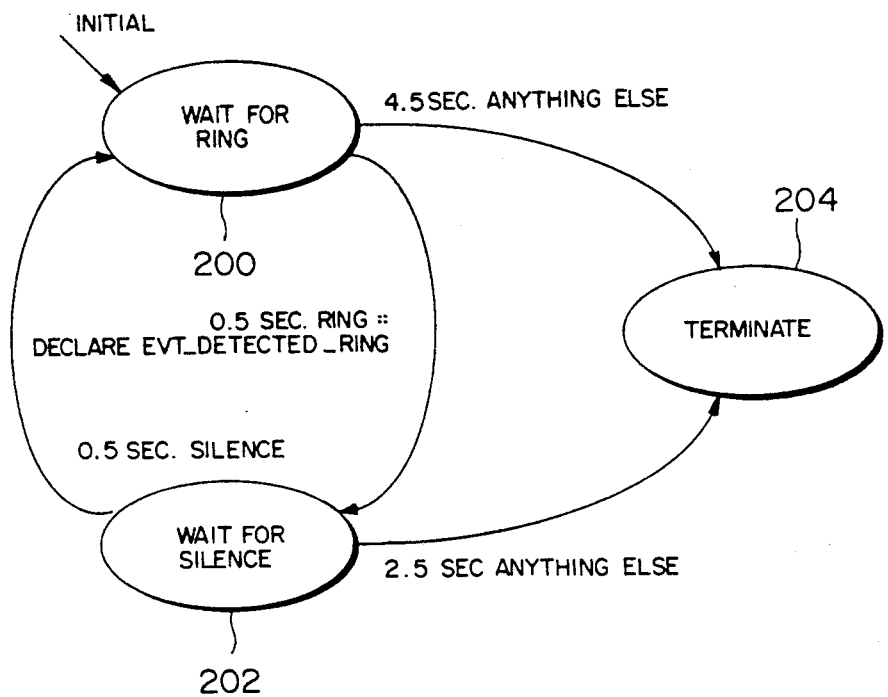
FIGS. 10 and 11 are state diagrams illustrating the operation of the finite state machines used for detecting ringing.
Figure 11:
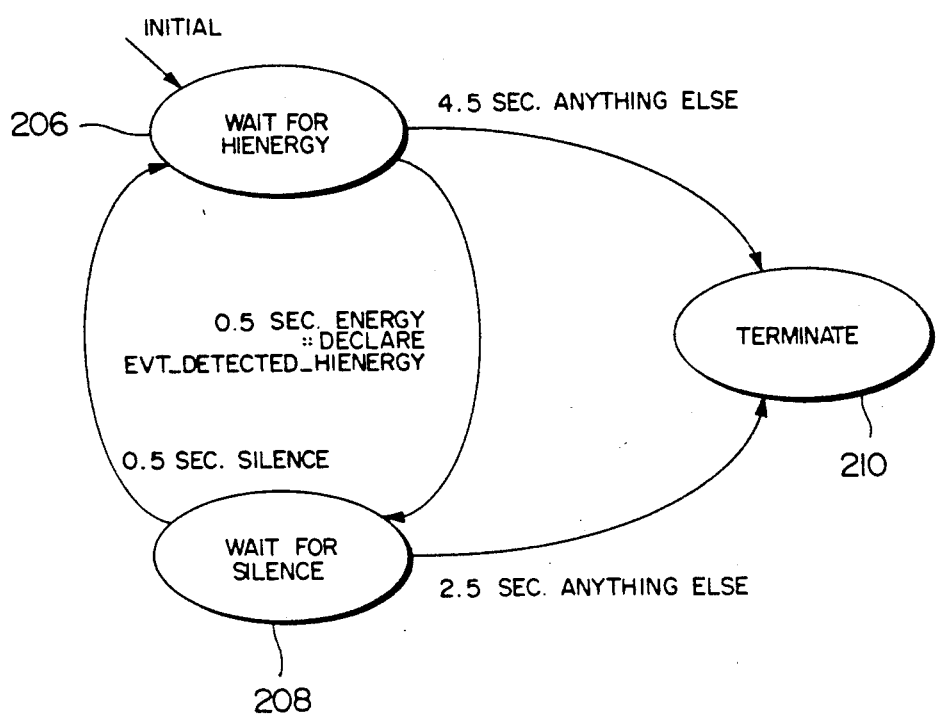
Figure 12:
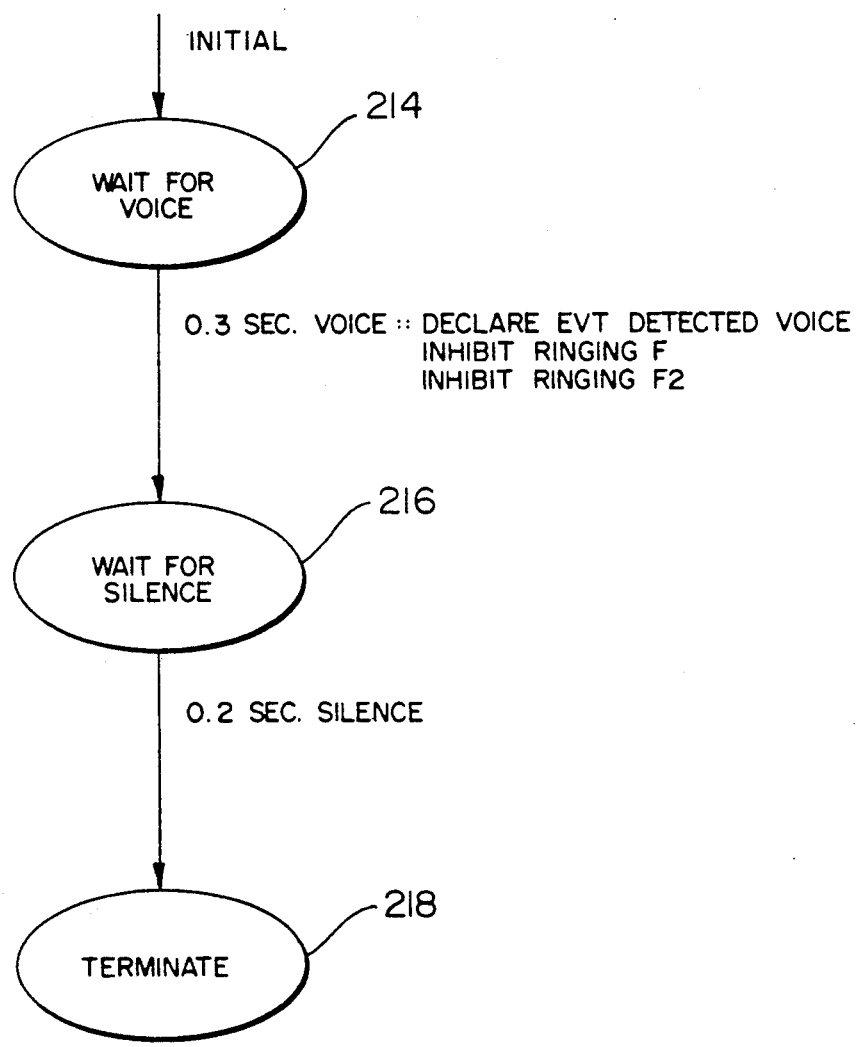
FIG. 12 is a state diagram illustrating the operation of the finite state machine used for detecting pickup.

The Transition Tables listed in Table A6 are symbolic representations of the state diagrams shown in FIGS. 10-12 and correspond to finite state machines which perform the state transitions shown by this state diagrams. In these diagrams, states are represented by ellipses, and state transitions by arrows. State transitions are labelled by the condition that causes them, followed optionally by any transition action to be taken. The initial state is labelled by an arrow marked "Initial". The terminal state is so marked.

For the first diagram in FIG. 10, labelled RingingF State Diagram, the initial state 200 is "Wait for Ring". In this state, if 0.5 seconds of contiguous ring is detected (i.e 50 consecutive Epochs with ring detected to be the best matched signal), the FSM declares the event "EVT-DETECTED RING", and transitions to state 202 labelled "Wait for Silence". On the other hand, if after 4.5 seconds a 0.5 second ring has not been detected, the FSM transitions to the terminal state 204, labelled "Terminate". At this point the FSM is stopped. Similarly, if the FSM is in state 202, then if 0.5 seconds of contiguous silence is detected, the FSM transitions to state 200. The FSM then cycles between states 200 and 202, as long as ringing is present and detected. Otherwise, if after 2.5 seconds a 0.5 second silence is not detected, the FSM transitions to the terminal state 204.

The FSM defined by this state diagram is non-terminal (i.e is "running") if ringing is present and detected, and is terminal if ringing is not present. Hence, the finite state machine defined by the state diagram shown in FIG. 10 detects ring failure. This state diagram defines ringing rather "loosely". In other words, there are many cadences that the FSM will accept as ringing. The range of cadences that this FSM accepts is roughly from 0.5 second on, 0.5 seconds off to 2.5 seconds on, 4.5 seconds off. This is intentional, as different sources of ringing (especially PBX's) generate cadences quite different from the standard 2 seconds on, 4 seconds off. The definition given covers all ringing signals in standard use, with some tolerance allowed for mis-detection.

The state diagram shown in FIG. 11, labelled RingingF2 State Diagram, accepts basically the same ringing signal as that accepted by the first diagram, with the exception that this state diagram uses the presence of "HiEnergy" (of no Particular frequency) in the Proper cadence to recognize ringing. The purpose of providing a finite state machine implementing this state diagram is to detect ringing in certain phone systems that do not generate the standard 440 Hz plus 480 Hz ring signal. To allow the host to distinguish this, this diagram declares "EVT-DETECTED HIENERGY" on the transition from "Wait for HiEnergy" in state 206 to "Wait for Silence" in state 208, rather than EVT DETECTED-RING. Like the state diagram of FIG. 10, this state diagram also includes a terminal state 210.

The state diagram shown in FIG. 12, labelled Pickup State Diagram, is used to detect when a phone is picked-up by an answering party. The initial state 216 is "Wait for Voice". In this state, if 0.3 seconds of contiguous voice energy is detected, the FSM embodied by this state diagram declares "EVT DETECTED VOICE", and transitions to state 216 labelled "Wait for Silence". In this state, the FSM waits for 0.2 seconds of silence, and then transitions to the terminal state (marked "Terminate"). This state diagram describes an FSM that terminates at the first pause after someone picks up the phone and speaks. Since there are no timeouts defined, this FSM could conceivably run forever. The higher level situation definition precludes this by defining a 30 second timeout. In addition, though not shown in Table A6, the transition from state 214 to 216 is accompanied by setting the inhibit flags of the RingingF and RingingF2 FSM's to inhibit further operation of these FSM's.

Figure 13:
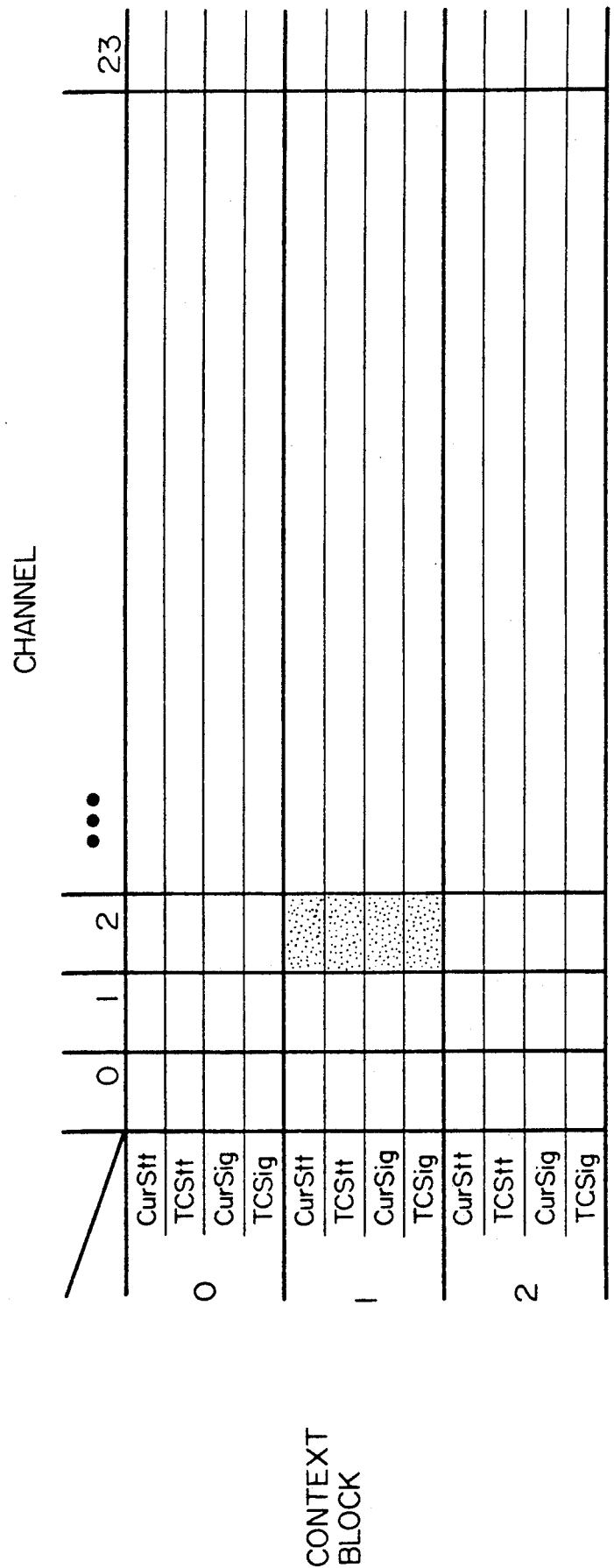
FIG. 13 is a diagram illustrating the context block indexing scheme for referencing the finite state machines running on data in each of 24 channels of information.

Situation 2, as defined in Table A4, runs these three state machines simultaneously. In the worst case, it may happen that all 24 channels are commanded to run situation 2. In this case, 3 FSM's are needed to run for each channel. Separate contexts must be kept for each of the 72 FSM's running (3 FSM's/channel × 24 channels). FIG. 13 illustrates this situation. A separate context block is provided for each channel (0-23), for each possible FSM (0-2) that can be running. For example, in the context block for Channel 2, FSM 1 is darkened in the FIG. Each context block contains the variables necessary to operate the FSM. These are labelled CurStt (Current State), TCStt (Time in Current State), CurSig (Current Signal), and TCSig (Time in Current Signal). Given these variables, and a transition table such as one of those shown in Table A6, a finite state machine can be implemented that behaves as described above, by means well known in the art.

Referring again to the definition of Situation 2 in Table A4, the lines that invoke an FSM start with the mnemonic SE_K_MONITOR. The next number or symbol on each such line is a flag. The first instance an entry in this table invokes an FSM is for the Pickup FSM, for which the flag has the value of 1. This indicates that when the Pickup FSM terminates, the situation should terminate and report a value of 1 in the termination report. The last number on this line is a 0. This indicates that when this FSM is running, the Context Block 0 should be used, as shown on FIG. 13. The next instance of an entry invoking an FSM is for the RingingF FSM, for which the flag has the value represented by the symbol -FSMGBASE. This value is special, in that it represents the start of a set of flag values that are reserved for finite state machine groups. A finite state machine group is a collection of finite state machines that are treated in a special manner. Any finite state machine invoked in a situation definition with a flag value equal to or less than FSMGBASE is a member of a finite state machine group. All members of the same group have the same flag value.

Another type of entry in a situation definition is a finite state machine group entry. This type of entry includes a number of entries identified to be contained in a particular finite state machine group. A finite state machine group is a set of finite state machines that are related in the following fashion.

A finite state machine group is non-terminal if any of its member finite state machines are non-terminal. Conversely, a finite state machine group is terminal if all of its members are terminal. Situation recognition runs all non-terminal finite state machines in a group and then determines if the group is terminal. If the group is determined to be terminal, then if the flag value is non-zero, situation recognition declares that a finite state machine group terminal match has been made and produces a termination report that contains the flag value. On the other hand if the flag value is zero, situation recognition continues.

A finite state machine group is used to recognize the failure of ringing where ringing is defined to be either the presence of a genuine ringing signal as determined from the signal meld list or the presence of a noisy ringing signal such as a repeating pattern of high energy for 2 seconds and silence for 4 seconds as determined from the power meld list.

Referring again to FIGS. 10 and 11, the two FSM's RingingF and RingingF2 are members of a finite state machine group, as indicated by the fact that they both have the same flag value, and by the fact that the flag value is equal to minus FSMGBASE. Consequently, ringing is determined to be present if either one or both of these FSM's are running, and ringing is determined to be absent if both of these FSM's are not running. Finally, the context block index value (the last value on the line in the definition of Situation 2 in Table A4 for these two FSM monitors) is 1 and 2, respectively. Because the index value for the first FSM (Pickup) is 0, each FSM uses a different context block so that the algorithm can correctly run each FSM.

A final entry in a situation definition is a timeout entry which contains a duration and a flag. A timeout occurs if no other entry matches within the duration value of time from when situation recognition commenced. For example, in Situation 1 of Table A4, a "Timeout" is declared when nothing else is detected after 6.0 seconds. Situation recognition then declares a timeout and terminates with a termination report containing the flag value −19.

As mention above, several of the entries in a situation definition include a flag. The value of the flag is included in the Situation Termination Report for communicating to the host whether or not a particular situation definition entry or condition has been detected. The assignment of the value of the flag to a particular condition or situation definition entry is totally arbitrary. A table of values and their meaning is stored in a memory of the host machine. When a Recognize Command Termination Report is returned to the host, the value of the flag is an indication to the host that a particular condition was detected or failed to occur. During implementation of the call progress monitor algorithm, the value of the flag may be zero. A value of zero indicates that to termination report is generated and monitoring continues.

Table A8 in the appendix lists the meanings of the flags used in Situations 1 and 2 of table A4. For example, if the host commands the call progress monitor algorithm to run Situation 1 and receives in a termination report the flag value 1, this indicates to the host that Dialtone was detected. Similarly, if the host commands the call progress monitor to run Situation 2 and receives in a termination report the flag value 1, this indicates to the host that pickup was detected.

Referring back to FIG. 2, the key component of the situation recognition portion 32 of the algorithm is the situation recognizer 42. The controlling input to the situation recognizer 42 is a situation definition. The situation recognizer relies on a particular situation definition to tell it what to recognize and what to do if something is recognized or if it is not recognized. A situation definition covers all possible conditions that may occur in a given situation and indicates when to terminate the recognition and return a recognition status or cause the situation recognizer 42 to announce an event and continue to recognize. The situation recognizer 42 invokes both the complex pattern matcher 38 and the finite state machine monitor 40.

As mentioned above, the complex pattern matcher 38 is invoked by the situation recognizer 42 to compare a complex pattern to the most recent data in a meld list. Referring now to FIG. 6 and the second entry in Table A5, an example will be described of the complex matching procedure for comparing an input with the complex pattern for the special information signal "customer irregularity". As noted in the second entry of Table A5, the customer irregularity pattern specifies that the signal meld list be examined for the sequence of tones: 913.8 Hz (SIT-1-lo) for 0.274 seconds followed by 1370.6 Hz (SIT-2-lo) for 0.274 seconds followed by 1776.7 Hz (SIT-3) for 0.380 seconds. As shown in FIG. 6, should the signal meld list actually contain the 913.8 Hz tone recognized for 0.265 seconds, followed by a short amount of unknown as indicated in the dark shading area, followed by 1370.6 Hz recognized for 0.240 seconds, followed again by some unknown, followed by 1776.7 Hz recognized for 0.355 seconds, the complex pattern match algorithm computes a measure of fit to be 0.926. This is computed by summing the time that the pattern matches the meld list and dividing the time of the pattern. If this measure exceeds a threshold value, a match is declared. Alternatively, it is possible to measure the duration of time in which the tones do not match and similarly computing a measure of fit which is subsequently subtracted from unity. In this alternative method, if this new value is greater than a threshold, it is declared that no match is made. It has been found that this latter technique often yields better use of a processor or computer.

Similar to the complex pattern matcher 38, the finite state machine monitor 40 is invoked by the situation recognizer 42 to recognize a continuing pattern. As an example, the transition table that monitors ringing and terminates on ringing failure is listed as the first table in the Table A6 and labeled "TT_RingingF". This transition table forces a match if RINGING is not occurring. The occurrence of the match indicates a failure, that is, no ringing is detected. If RINGING is occurring, this transition table monitors it forever. The failure status is determined by the higher level situation table entry T_SE_MONITOR, described hereinafter. This transition table indicates a terminal state.

The initial state of the transition table "TT_RingingF" is state 1 and the terminal state is state 0. If the current state is 1 and the current signal detected is ringtone for a period of time greater than 0.5 seconds, the transition table requires that state 2 be the next current state. If the current state is 1 and the time in the current state is greater than 4.5 seconds, on the other hand, then the next current state is state 0 (the terminal state - no ring is detected). If the current state is 2 then an event report is generated termed "ring detected" and the next current state is state 3. If the current state is state 3 and the current signal is silence for a period of time greater than 0.5 seconds, then the next current state is state 1. On the other hand, if the current state is state 3 and the time in the current state is greater than 2.5 seconds, then the next current state is state 0 (the terminal state - a constant ring)

The second table in Table A6, labeled "TT_RingingF2", is essentially identical to the first, but looks at the power meld list rather than the signal meld list, so as to detect the presence of ringing solely by cadence rather than by both cadence and tone. This is required for robust algorithm performance with older phone systems.

The third table in Table A6, labeled "TT_Pickup" detects the occurrence of a phone pickup and a human utterance. It does this by matching the following pattern: at least 0.3 seconds of continuous voice, followed by anything for any period of time as long as it is not silence, followed by 0.2 seconds of silence. When at least 0.3 seconds of continuous voice is detected, a voice detected event is generated. This allows the host to measure the time from the onset of voice to the 0.2 seconds of pause when the finite state machine monitor terminates (and generates a Recognize Situation Termination Report). When the host receives the termination report, it can use this time measurement to crudely indicate what sort of party answered the phone, and can begin conveying speech to the party dialed by the host.

From these three transition tables, it is appreciated that the call progress monitor detects ringing signals as long as they exist (up to 30 seconds) and does nothing. However, when ringing is not detected or no longer detected, a check is made for 0.3 seconds of voice followed by 0.2 seconds of silence indicating that the line has been picked up.

Situation 1 listed in Table A4 is designed to obtain a phone line and detected a dialtone on it prior to placing a call. Each condition or entry in the situation definition is tested or run every Epoch. Specifically, all of the entries with a label SIGNAL are run, and TIMEOUT, every Epoch. When the entry labelled END is reached, situation recognition starts again at the next Epoch from the first entry in the table. This particular situation succeeds upon detecting 0.5 seconds of dialtone on the line. In actuality, this translates into detecting dialtone for 20 consecutive Epochs. Upon detecting this condition, the algorithm terminates and reports a flag value of 1 indicating a success in detecting dialtone. If any other flag value is reported, this is an indication that dialtone was not detected.

Specifically, it is possible when accessing a phone line that another person is on the line, and voice would then be detected by the algorithm and the flag value $-8$ is reported. It is also possible that another person (or machine) has just accessed the phone line to place a call and a ringing signal may be present. This would be indicated with a flag value of $-1$ in a termination report. So long as a flag value other than 1 is reported, the host is told that no dialtone is present on the line and it may be desirable to try again later or diagnose a problem with the phone line. In this regard, the host may include diagnosing software that can directed the machine to address the condition of a signal other than dialtone being detected on the phone line. Diagnosing procedures will be described in detail hereinafter.

Situation 2 listed in Table A4, is used for monitoring call progress after a telephone number has been dialed and is slightly more complex because it is more likely that other types of signals may be present on the line after dialing a phone number. This situation allows the phone to ring for up to 30 seconds. Ringing is monitored either by the presence of a normal ring signal of the proper cadence or by the presence of noise in the proper cadence. An intermediate event report termed "RING_DETECTED" is generated whenever a ring is detected. Then, the algorithm monitors for a pickup of the phone line, 0.3 seconds of steady voice, and 0.2 seconds of silence. Once 0.3 seconds of voice is detected, an intermediate event report termed "VOICE_DETECTED" is made. After the 0.2 seconds of silence, the situation terminates with a success by returning a flag value of 1. Otherwise, a failure is declared when neither normal nor noisy ringing is detected, 0.1 seconds of dialtone is detected, 0.1 seconds of busytone or weird busy is detected, or when any special information signal or special information tone pattern is detected. Furthermore, when the special information signal is detected, the type of special information signal is reported so that further diagnosing can be made by the host. Finally, a "Timeout" is declared if nothing is detected after 30 seconds.

When the situation recognizer 42 is commanded to recognize Situation 2, each of the procedures listed in Table A4 (under Situation 2) are performed. Specifically, when commanded to recognize Situation 2, the situation recognizer 42 invokes the complex pattern matcher 38 to look for matching of the following complex patterns:

STP_IC
STP_NC-B

STP_NC-I
STP_RO-B
STP_RO-I
STP_VC, which are listed in Table A5. In addition, the situation recognizer 42 invokes the finite state machine monitor 40 to monitor the following state transitions:

TT_PICKUP
TT_RINGINGF
TT_RINGINGF2, which are listed in Table A6. The value of the flag or termination report is listed beside each of the entries for Situation 2. As shown in the entries for Situation 2, the value of the flag corresponds to a particular type of event detected. For example, when the complex pattern matcher finds a match for the any of the special information tone patterns listed, which indicates the detection of a special information tone or signal, the situation terminates and reports a flag or report number, such as, for example, −5 indicating that the special information signal VC was detected. Similarly, if the finite state machine monitor 40 finds a match for the table labelled BUSY DETECTED, the situation is terminated and reported with a flag −3, indicating that the normal busy signal was detected.

Situation 2 uses all three of the transition tables listed in Table A6 to detect a phone pickup. This can be seen as follows. A phone call is successfully proceeding if the phone is ringing. If the phone rings for too long a period of time, then one can assume that no one will answer. Situation 2 generates a Termination Report after 30 seconds of ringing with no pickup. As can be seen in the second table in Table A4, Situation 2 reports a timeout with a flag value of −19 to indicate this condition. On the other hand, if no ringing is heart, then something is wrong with the call. Situation 2 uses transition tables TT_RingingF and TT_RingingF2 in a "finite state machine group" (further explained hereinbefore) to detect the absence of ringing. These transition tables will cause the absence of ringing to be reported about 5 seconds after the normal phone ringing pattern is not heard. (At least 4 seconds is needed to determine that nor ring is going to happen.) Such a condition is reported by a flag with a value - FSMGBASE. (FSMGBASE is a symbol defined to have the value 20.) If any other signal is detected, such as dialtone, busy, or one of the Special Information signals, then something is wrong with the call. If this happens, Situation 2 generates a Termination Report that uniquely identifies the failure to detect ringing. For example, if the phone is busy, Situation 2 will generate a Termination Report with flag value −2 (or −3 if weird busy is detected but normal busy is not detected). Finally, if someone picks up the phone, Situation 2 uses transition table TT_Pickup to detect a human's voice, and to identify when they pause, so that the host can, for example, initiate the generation of voice prompting at the proper time.

Because only one type of call progress signal can exist on a phone line (or a single channel) during any particular interval of time (such as an Epoch), by examining all the possibilities defined in a particular situation using the complex pattern matcher 38 and the finite state machine monitor 40, the call progress monitor 10 can precisely follow the progress of a telephone call.

OPERATION OF THE CALL PROGRESS MONITOR

When monitoring the progress of a telephone call, the algorithm is commanded to recognize certain situations according to predefined situation definitions. Once a particular definition is recognized, not recognized, or an intermediate report is made, the algorithm is commanded to continue recognizing that particular situation or to recognize another situation. The sequence of situations which the call progress monitor algorithm is commanded to recognize depends on the particular application of the algorithm. The parameters of the situation definitions, signal definitions, complex pattern definitions, finite state machine definitions, and the particular frequencies of tones of interest may vary. For example, the number and type of special information signals can be expanded as more of these type of signals are used by the telephone companies. It is necessary only to sample these ne signals for defining at what frequencies the special information tones exist.

Figure 7:
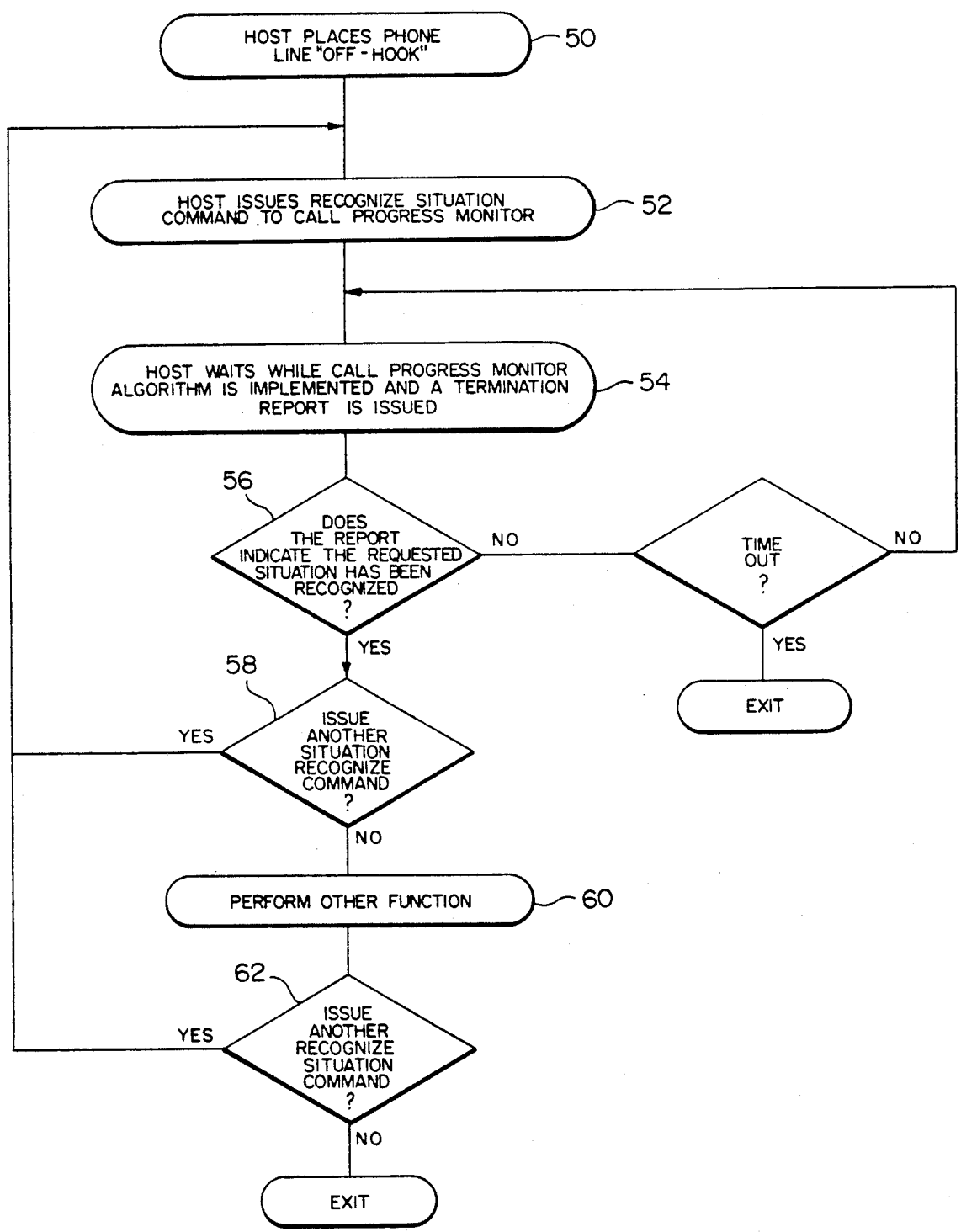
FIG. 7 is flow diagram illustrating the general operation of the call progress monitor together with a host controlling machine.

An example of the use of the call progress monitor algorithm by a host computer that is placing a phone call follows with reference to FIGS. 1 and 7. A software algorithm in the host 11 first places the phone "off-hook" in step 50 and then commands the call progress monitor 10 to recognize a particular situation in step 52, such as, for example, dialtone by issuing the corresponding Recognize Situation Command specifying Situation 1, listed in Table A4.

The host 11 then waits for the call progress monitor 10 to generate a Recognize Command Termination Report during step 54. This report may, for example, identify either that (0.5 seconds of) dialtone was detected, or that some other outcome, such as that the call progress monitor 10 waited 6 seconds without detecting anything on the line. Such would be the case, for example, if the phone line were actually "dead". Upon receiving the Recognize Command Termination Report, in step 56 the host examines the report to determined if it indicates that the desired situation, such as dialtone, for example, was detected. If the desired situation was not detected, and a preset time out has not been exceeded in step 55, step 54 is repeated. Otherwise, depending on the Recognize Command Termination Report, the host can decide whether to issue another Recognize Situation Command or to perform some other function in step 58.

If another Recognize Situation Command is to be issued, the host issues a new command as indicated by the return to step 52 in the diagram of FIG. 7. On the other hand, the host may decide in step 58 to perform some other function in step 60, such as dialing a desired phone number, typically by placing Dual Tone Multiple Frequency (DTMF) signals on the phone line 13. Furthermore, depending on the type of function performed in step 60, the host may issue another Recognize Situation Command as illustrated by step 62. In the instant example, the host 11 commands the call progress monitor to recognize the outcome of the phone call by issuing a Recognize Situation Command specifying Situation 2, also listed in Table A4. This situation monitors that the line is ringing, is picked up and answered by a voice, or is signalling busy or one of a number of special information tones as part of a special information signal.

Figure 8:
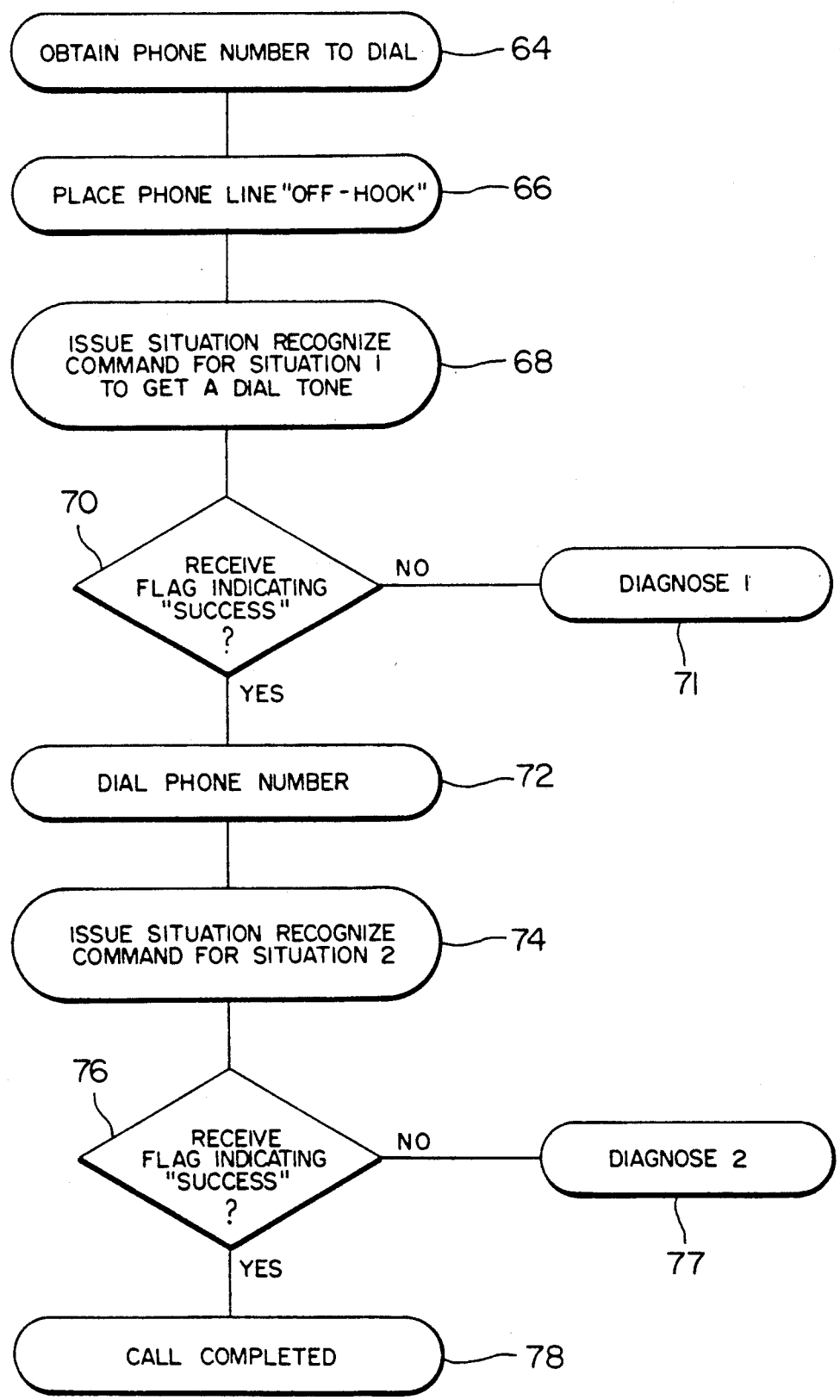
FIG. 8 is a flow diagram illustrating the general operation of the host controlling machine in response to reports received from the call progress monitor.

FIG. 8 illustrates a flow diagram corresponding to a software program used in the host machine to place a phone call and interact with the call progress monitor of the present invention. The host first obtains the telephone number to be called in step 64, then places the line "off-hook" in step 66. The host then issues a Recognize Situation Command in step 68 to the call progress monitor specifying the command for recognizing Situation 1 to detect a dialtone on the line. Eventually, a flag will be returned from the call progress monitor to the host. In step 70 the host determines whether this flag indicates a success in finding a dialtone or some other condition. If a flag value indicating some condition other than dialtone was detected, the host enters a Diagnose-1 routine 71 described hereinafter. Otherwise, if a flag value indicating that dialtone was detected, the procedure continues to step 72 in which the host dials the phone number, by means well known in the art.

After the phone number is dialed, the host issues another Recognize Situation Command in step 74 specifying Situation 2. As before, the host waits to receive a flag from the call progress monitor. In step 76, the value of the flag is examined. If the value of the flag indicates that a condition other than pickup has occurred, the procedure diverts to a Diagnose-2 routine 77 described hereinafter. Otherwise, the flag value indicates that a successful pickup occurred and the call is completed as indicated in step 78.

Figure 9A:
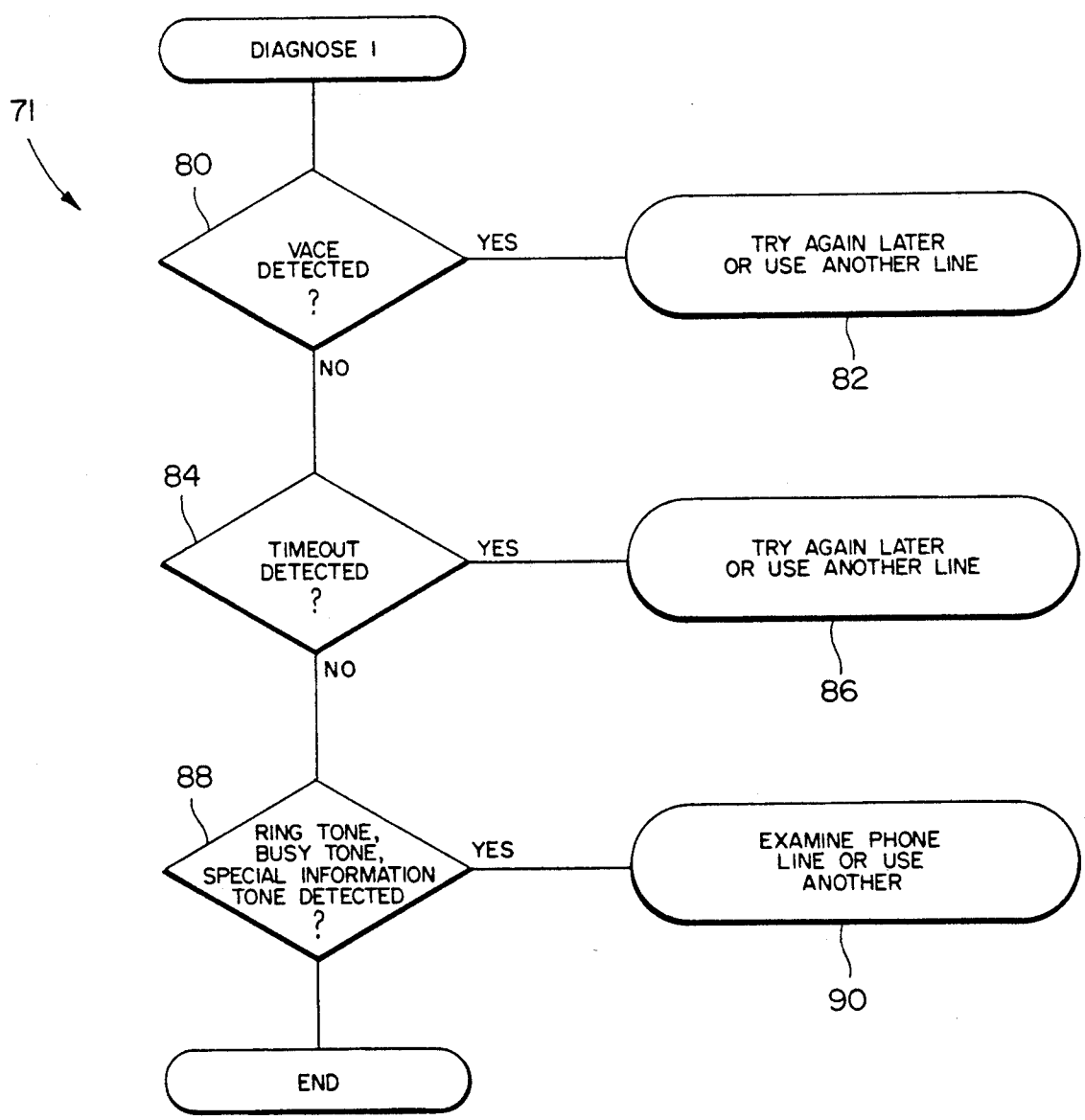
FIGS. 9A and 9B are flow diagrams illustrating diagnosing routines of the host controlling machine used for determining and dealing with particular call progress signals detected by the call progress monitor.
Figure 9B:
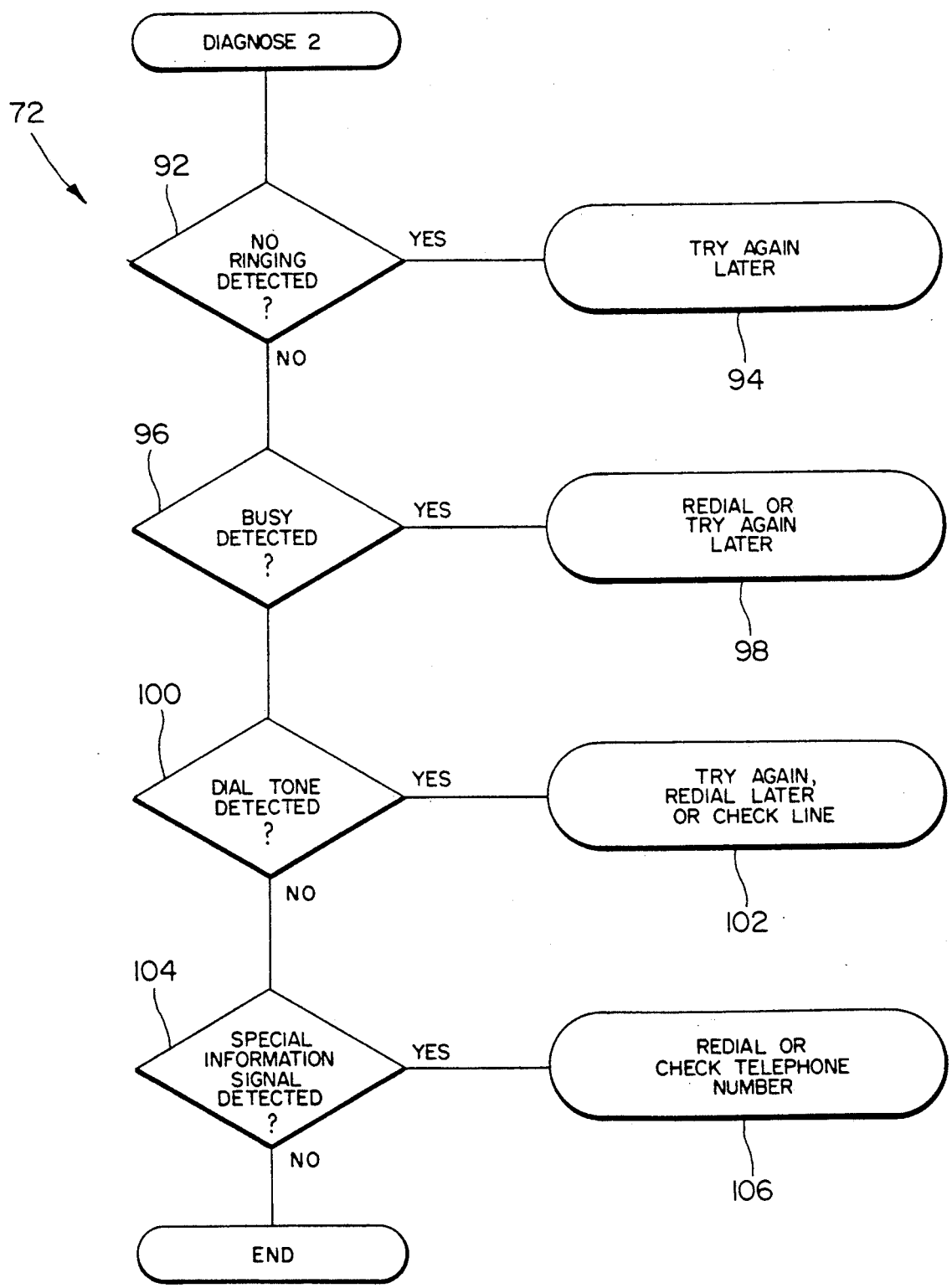

FIGS. 9A and 9B illustrate the Diagnose-1 and Diagnose-2 routines in detail. Diagnose-1 is used when the call progress monitor returns a flag indicating that a condition other than dialtone was detected. Specifically, a determination is made in step 80 for the presence of voice on the line. If voice is detected on the line, the host will try the line again later or access another line to place the call as shown in step 82. Next, a determination is made in step 84 for a flag value indicating a Timeout occurred when running Situation 1. If Timeout occurred, the host will try again later or use another line as evidenced in step 86. Finally, a determination is made in step 88 for the presence of a ringtone, busytone, or a special information tone. Also, the identity of one of these signals is made in step 88. Depending on which of these signals existed, the host will use another line and/or alert a user to check a particular phone line as shown in step 90.

The Diagnose-2 routine shown in FIG. 9B is used when a condition other than pickup is detected when running Situation 2. In step 92, it is determined whether no ringing signal was detected. If this is true, then the host will try again on the same or another line later in step 94. In step 96, it is determined whether a busy signal (regular o weird) is detected and identifies which of these busy signals is detected. Depending on the type of busy signal detected, the host may try again later in step 98 or redial the number. In step 100, the presence of dialtone is determined, and if so, the host will redial, try again later, or check the line in step 102. Finally, in step 104, the presence and identity of a special information signal is determined. Then, depending on which type of information signal is present, the host will redial the number or check the validity of the number in step 106.

It is to be understood that the structure and complexity of the diagnosing routines may vary depending on the particular application. Also, these routines may be embodied by very simple algorithms described or by faster and more sophisticated decision making software, well known in the art.

The call progress monitor algorithm of the present invention can be used in several environments. It is envisioned that the algorithm has utility in voice mail systems or other telephone interactive systems which make outgoing phone calls.

Particularly, the present invention has utility in the anonymous interactive telephone systems disclosed in U.S. Pat. Nos. 4,847,890 and 4,878,239. In these systems, it is necessary, under certain conditions, to anonymously connect a caller to a subscriber without the caller knowing the identity (and telephone number) of the subscriber. Consequently, while maintaining connection with the caller, the system dials the subscriber based on a telephone number stored in a memory of the system. The call progress monitor of the present invention is used to monitor the progress of the outgoing phone call to the subscriber. Upon the call being completed and picked up by the subscriber under the control of the call progress monitor, the anonymous interactive telephone system then permits the caller to speak with the subscriber. In this application, the host is embodied as the anonymous interactive telephone system.

Yet another application of the call progress monitor algorithm according to the present invention is in large telephone switching networks. Specifically, certain switching units are placed on the back of large telephone switching stations for providing special services. Such switches are know in the art as "boutique" switches, such as, for example, a switch sold under the name of Summa SDS 1000, by Summa Four, Inc. Typically, the boutique switch has a space for building other switching structures like those associated, with special services, such as the interactive telephone systems described above. The call progress monitor of the present invention may be attached to the boutique switch for interfacing with a special services device (hereinbefore referred to as host).

Furthermore, the algorithm can be modified to detect certain tones generated by telecopier machines, modems and message recording machines for communicating with other machines and people. In this regard, Situation 2 may be expanded to include the detection of facsimile machines tones and modem signals. Situation 2 can also be expanded to detect tones typical of voice recording message answering machines so that appropriate action can be taken by the host.

Further yet, the call progress monitor algorithm of the present invention can be modified to detect other types of telephone signals, such as Dual Tone Multiple Frequency (DTMF) and Multiple Frequency (MF) signals which are audible signals. DTMF tones are the standard "touch-tones" produced by a touch-tone phone. MF tones are used by the Central Office of the telephone company for Central Office Signalling. New situation definitions can be used, or the described situation definitions can be expanded, to incorporate detection of more sophisticated signaling using DTMF and MF signals.

TABLE A1

| | | SIGNAL DEFINITIONS | | | | |
|---|---|---|---|---|---|---|
| Index | Name | MinSig | MaxTwist | MaxVar | P-Vector | Tone Frequencies |
| 0 | DIALSIG | .70 | 5.5 | .05 | 1,1,0,0, 0,0,0,0, 0 | 350 Hz + 440 Hz |
| 1 | RINGSIG | .70 | 5.5 | .05 | 0,1,1,0, 0,0,0,0, 0 | 440 Hz + 480 Hz |
| 2 | BUSYSIG | .70 | 5.5 | .10 | 0,0,1,1, 0,0,0,0, 0 | 480 Hz + 620 Hz |

TABLE A1-continued

SIGNAL DEFINITIONS

| Index | Name | MinSig | MaxTwist | MaxVar | P-Vector | Tone Frequencies |
|---|---|---|---|---|---|---|
| 3 | SIT1_LO | .50 | 1.0 | .05 | 0,0,0,0, 1,0,0,0, 0 | 913.8 Hz |
| 4 | SIT1_HI | .50 | 1.0 | .05 | 0,0,0,0, 0,1,0,0, 0 | 985.2 Hz |
| 5 | SIT2_LO | .50 | 1.0 | .05 | 0,0,0,0, 0,0,1,0, 0 | 1370.6 Hz |
| 6 | SIT2_HI | .50 | 1.0 | .05 | 0,0,0,0, 0,0,0,1,0, 0 | 1428.5 Hz |
| 7 | SIT3 | .50 | 1.0 | .05 | 0,0,0,0, 0,0,0,1, 0 | 1776.7 Hz |
| 8 | VOICE | .15 | 1.0 | .30 | 0,0,0,0, 0,0,0,0, 1 | glotal + ... |
| 9 | SILENCE" | | | | | below threshold |
| 10 | UNKNOWN" | | | | | unknown |
| 11 | HIENRGY" | 0.0 | | | | High Raw Energy |

TABLE A2

GOERTZEL COEFFICIENTS

| | |
|---|---|
| 1.924910 | 350.0 Hz |
| 1.881762 | 440.0 Hz |
| 1.859553 | 480.0 Hz |
| 1.767531 | 620.0 Hz |
| 1.506645 | 913.8 Hz |
| 1.430556 | 985.2 Hz |
| 0.948883 | 1370.6 Hz |
| 0.867869 | 1428.5 Hz |
| 0.348964 | 1776.7 Hz |

TABLE A3

Typical Voice Filter Coefficients
(Low Pass, 300 Hz Cutoff, 2 Sections)

| Section | A | B | C | D | E |
|---|---|---|---|---|---|
| 1 | 0.0317476 | −1.923252 | 0.9759489 | −1.918622 | 1.000000 |
| 2 | 1.0000000 | −1.860514 | 0.8793006 | −1.706916 | 1.000000 |

Table A4

SITUATION DEFINITIONS

Situation 1 - Seize line after going off-hook or doing a hook-flash.

Rules:

Succeed on .5 sec of steady Dialtone.
    Fail on .1 sec (steady) of any other tone (.5 sec of voice)
    Timeout and fail after 6 seconds.

```
T_SDT SDT_0 =  0, "SDT_0 - Seize Line",
    {SE_K_SIGNAL,   1, "Dialtone-->SUCCESS", DIALTONE, SIGLIST, 0.50}, SE_K_SIGNAL,   -1, "Ringtone", RINGTONE, SIGLIST, 0.10
    SE_K_SIGNAL,   -2, "Busytone", BUSYTONE, SIGLIST, 0.10
    SE_K_SIGNAL,   -3, "SIT_1_Lo", SIT_1_LO, SIGLIST, 0.10'
    SE_K_SIGNAL,   -4, "SIT_1_Hi", SIT_1_HI, SIGLIST, 0.10
    SE_K_SIGNAL,   -5, "SIT_2_Lo", SIT_2_LO, SIGLIST, 0.10
    SE_K_SIGNAL,   -6, "SIT_2_Hi", SIT_2_HI, SIGLIST, 0.10}
    SE_K_SIGNAL,   -7, "SIT_3", SIT_3, SIGLIST, 0.10
    SE_K_SIGNAL,   -8, "Voice", VOICE, SIGLIST, 0.50

SE_K_TIMEOUT, -19, "Timeout", 0,0, 6.00

SE_K_END,       0, "End"
```

Situation 2 - Detect phone pickup after dial-out

Rules:

Wait for up to 30 seconds of recognized ringing.

- declare event EVT_RING_DETECTED every ring

Recognize Pickup (via TT_Pickup):

- wait for .3 sec of steady voice
- declare event EVT_VOICE_DETECTED
- wait for .2 sec of silence
- terminate w/Success Fail on recognizing:
- ring failure (no ringing and no ringing2 -- see TT_RingingF/F2)
- .1 sec of dialtone
- .1 sec of busytone or weird busy pattern (see WEIRD_BUSY)
- any SIT pattern, identify the SIT pattern.
- timeout, after 30 seconds.

```
T_SDT    SDT_1 = 1, "SDT_1 - Detect Phone Pickup or Failure",
    SE_K_MONITOR,   1, "Pickup --> SUCCESS",  (INT24)&TT_Pickup,0

SE_K_MONITOR,   -FSMGBASE, "Ringing (Failure)",
                        (INT24)&TT_RingingF, 1
    SE_K_MONITOR,   -FSMGBASE, "Ringing2 (Failure)",
                        (INT24)&TT_RingingF2,2

SE_K_SIGNAL,    -1, "Dialtone",DIALTONE,SIGLIST, 0.10
    SE_K_SIGNAL,    -2, "Busytone",BUSYTONE,SIGLIST, 0.10
    SE_K_COMPLEX,   -3, "WEIRD-BUSY",(INT24)&WEIRD_BUSY SE_K_COMPLEX,   -4, "STP_IC",(INT24)&STP_IC},
    SE_K_COMPLEX,   -5, "STP_NC-B",(INT24)&STP_NCB
    SE_K_COMPLEX,   -6, "STP_NC-I",(INT24)&STP_NCI
    SE_K_COMPLEX,   -7, "STP_RO-B",(INT24)&STP_ROB
    SE_K_COMPLEX,   -8, "STP_RO-I",(INT24)&STP_ROI
    SE_K_COMPLEX,   -9, "STP_VC",(INT24)&STP_VC SE_K_TIMEOUT,   -19, "Timeout-->bad call",0,0,30.0
    SE_K_END,       0, "End"
```

TABLE A5
COMPLEX PATTERN DEFINITIONS

```
        STP_NCB =                   Special Info Tone NC-B
"NC-B", SIGLIST, 0, DURATION(1.14)
 SIT_3,0,      .380,  "SIT_3/Long"
 SIT_2_HI,0,   .380,  "SIT_2_Hi/Long"
 SIT_1_HI,0,   .380,  "SIT_1_Hi/Long"
 CP_K_END,0,   0.00,  "End"
```

```
        STP_IC =                          Special Info Tone IC
"IC", SIGLIST, 0, DURATION(0.928)
  SIT_3,0,      .380,    "SIT_3/Long"
  SIT_2_LO,0,   .274,    "SIT_2_Lo/Short"
  SIT_1_LO,0,   .274,    "SIT_1_Lo/Short"
  CP_K_END,0,   0.00,    "End"

STP_VC =                          Special Info Tone VC
"VC", SIGLIST, 0, DURATION(1.034)
  SIT_3,0,      .380,    "SIT3/Long"
  SIT_2_LO,0,   .274,    "SIT_2_Lo/Short"
  SIT_1_HI,0,   .380,    "SIT_1_Hi/Long"
  CP_K_END,0,   0.00,    "End"

STP_ROB =                         Special Info Tone RO-B
"RO-B", SIGLIST, 0, DURATION(1.034)
  SIT_3,0,      .380,    "SIT_3/Long"
  SIT_2_HI,0,   .380,    "SIT_2_Hi/Long"
  SIT_1_LO,0,   .274,    "SIT_1_Lo/Short"
  CP_K_END,0,   0.00,    "End"

STP_NCI =                         Special Info Tone NC-I
"NI-I", SIGLIST, 0, DURATION(1.14)
  SIT_3,0,      .380,    "SIT_3/Long"
  SIT_2_LO,0,   .380,    "SIT_2_Lo/Long"
  SIT_1_LO,0,   .380,    "SIT_1_Lo/Long"
  CP_K_END,0,   0.00,    "End"}});

STP_ROI =                         Special Info Tone RO-I
"RO-I", SIGLIST, 0, DURATION(1.034)
  SIT_3,0,      .380,    "SIT_3/Long"
  SIT_2_LO,0,   .380,    "SIT_2_Lo/Long"
  SIT_1_HI,0,   .274,    "SIT_1_Hi/Short"
  CP_K_END,0,   0.00,    "End"

WEIRD_BUSY =
"WEIRD-BUSY", PWRLIST, 0, DURATION(2.0)
  HIENERGY,0,   .350,    "HIENERGY"
  SILENCE,0,    .650,    "SILENCE"
  HIENERGY,0,   .350,    "HIENERGY"
  SILENCE,0,    .650,    "SILENCE"
  CP_K_END,0,   0.00,    "End"

FAST_BUSY =
"FASTBUSY", SIGLIST, 0, DURATION(1.0)
  SILENCE,0,    .300,    "SILENCE"
  BUSYTONE,0,   .200,    "BUSYTONE"
  SILENCE,0,    .300,    "SILENCE"
  BUSYTONE,0,   .200,    "BUSYTONE"
  CP_K_END,0,   0.00,    "End"

BUSY =
"BUSY", SIGLIST, 0, DURATION(2.0)
  SILENCE,0,    .500,    "SILENCE"
  BUSYTONE,0,   .500,    "BUSYTONE"
  SILENCE,0,    .500,    "SILENCE"
  BUSYTONE,0,   .500,    "BUSYTONE"
  CP_K_END,0,   0.00,    "End"
```

Table A6  Transition Tables

TT_RingingF (Signal List Ringing Failure)

T_TT  TT_RingingF = "RingingF", SIGLIST, in SILENCE; .5 sec RINGTONE: goto state 2; timeout after 4.5 sec
      1, RINGTONE,        0.5, 2, 0, "Detected Ringtone"
      1, TT_K_TIMEOUT,    4.5, 0, 0, "Timeout waiting for ring"

declare EVT_DETECTED_RING
      2, TT_K_DCLR_EVNT, 0.0, 3, EVT_DETECTED_RING,
                    "Declare Ring Detected"

in RING; .5 sec SILENCE: goto State 1; timeout after 2.5 seconds
      3, SILENCE,          0.5, 1, 0, "Detected Silence"
      3, TT_K_TIMEOUT,    2.5, 0, 0, "Timeout waiting for silence"
      0, 0,                  0.0, 0, 0, NULL TT_RingingF2 (Power List Ringing Failure)

T_TT TT_RingingF2 = "RingingF2", PWRLIST, in SILENCE; .5 sec of HIRENRGY: --> 2; timeout after 4.5 sec
      1, HIRENRGY,       0.5, 2, 0, "Detected Hi Energy"
      1, TT_K_TIMEOUT,    4.5, 0, 0, "Timeout waiting for Hi Raw Energy"

declare EVT_DETECTED_HIRENRGY; --> 3
      2, TT_K_DCLR_EVNT, 0.0, 3, EVT_DETECTED_HIRENRGY,
                    "Declare HiREnrgy"

in HIRENRGY; .5 seconds of SILENCE: --> 1; timeout after 2.5 sec
      3, SILENCE,          0.5, 1, 0, "Detected Silence"
      3, TT_K_TIMEOUT,    2.5, 0, 0, "Timeout waiting for silence"

0, 0,                  0.0, 0, 0, NULL

TT_Pickup transition table

T_TT TT_Pickup = "Pickup", SIGLIST, on .3 seconds of voice goto State 2, wait here forever
      1, VOICE,            0.3, 2, 0, "Detected Voice"

Declare voice detected event, goto State 3
      2, TT_K_DCLR_EVNT, 0.0, 3, EVT_DETECTED_VOICE,
                    "Declare Voice Detected"

wait forever for .2 seconds of pause, then Terminate
      3, SILENCE,          0.2, 0, 0, "Detected Pause"

0, 0,                  0.0, 0, 0, NULL

TABLE A7

DATA FOR SPECIAL INFORMATION SIGNAL IC

```
SIT1_LO, Fit=2.615 Conf=1.000 (1)
DumpEpoch bgproc @2E7B8 N=1 Avail=1 BestMatch=3 Conf=1.000
 Pwr =   .011    .007    .007    .037    .808    .085    .020    .003    .009    .010
 Sig =   .000    .000    .000   2.615    .000    .000    .000    .000    .000
 PeakP=1.000 SSS_FD_P=.000 TotF/RPwr=25546.471/102.931 FD_TP=.000
SIT1_LO, Fit=2.577 Conf=1.000 (2)
DumpEpoch bgproc @2E6E0 N=2 Avail=1 BestMatch=3 Conf=1.000
 Pwr =   .004    .013    .013    .026    .789    .093    .023    .012    .013    .009
 Sig =   .000    .000    .000   2.577    .000    .000    .000    .000    .000
 PeakP=1.000 SSS_FD_P=.000 TotF/RPwr=25905.387/102.566 FD_TP=.000
SIT1_LO, Fit=2.583 Conf=1.000 (3)
DumpEpoch bgproc @2E7B8 N=3 Avail=1 BestMatch=3 Conf=1.000
 Pwr =   .007    .011    .011    .028    .792    .090    .023    .011    .013    .009
 Sig =   .000    .000    .000   2.583    .000    .000    .000    .000    .000
 PeakP=1.000 SSS_FD_P=.000 TotF/RPwr=25861.861/102.175 FD_TP=.000
SIT1_LO, Fit=2.621 Conf=1.000 (4)
DumpEpoch bgproc @2E6E0 N=4 Avail=1 BestMatch=3 Conf=1.000
 Pwr =   .013    .006    .007    .036    .811    .084    .019    .004    .007    .010
 Sig =   .000    .000    .000   2.621    .000    .000    .000    .000    .000
 PeakP=1.000 SSS_FD_P=.000 TotF/RPwr=25442.506/102.917 FD_TP=.000
SIT1_LO, Fit=2.581 Conf=1.000 (5)
DumpEpoch bgproc @2E7B8 N=5 Avail=1 BestMatch=3 Conf=1.000
 Pwr =   .006    .011    .014    .027    .791    .090    .021    .011    .014    .010
 Sig =   .000    .000    .000   2.581    .000    .000    .000    .000    .000
 PeakP=1.000 SSS_FD_P=.000 TotF/RPwr=25886.764/102.750 FD_TP=.000

•
                              •
                              •

SIT1_LO, Fit=2.466 Conf=1.000 (10)
DumpEpoch bgproc @2E6E0 N=10 Avail=1 BestMatch=3 Conf=1.000
 Pwr =   .020    .017    .020    .015    .733    .086    .034    .027    .032    .012
 Sig =   .000    .000    .000   2.466    .000    .000    .000    .000    .000
 PeakP=1.000 SSS_FD_P=.000 TotF/RPwr=27125.578/102.247 FD_TP=.000
SIT2_LO, Fit=2.462 Conf=1.000 (11)
DumpEpoch bgproc @2E7B8 N=11 Avail=1 BestMatch=5 Conf=1.000
 Pwr =   .007    .010    .009    .007    .021    .021    .732    .159    .012    .017
 Sig =   .000    .000    .000    .000    .000   2.462    .000    .000    .000
 PeakP=1.000 SSS_FD_P=.000 TotF/RPwr=28105.031/103.274 FD_TP=.000
SIT2_LO, Fit=2.474 Conf=1.000 (12)
DumpEpoch bgproc @2E6E0 N=12 Avail=1 BestMatch=5 Conf=1.000
 Pwr =   .010    .004    .005    .012    .018    .024    .738    .160    .010    .014
 Sig =   .000    .000    .000    .000    .000   2.474    .000    .000    .000
 PeakP=1.000 SSS_FD_P=.000 TotF/RPwr=27688.578/102.030 FD_TP=.000

•
                              •
                              •

SIT2_LO, Fit=2.397 Conf=1.000 (21)
DumpEpoch bgproc @2E7B8 N=21 Avail=1 BestMatch=5 Conf=1.000
 Pwr =   .011    .013    .014    .007    .026    .017    .699    .129    .065    .015
 Sig =   .000    .000    .000    .000    .000   2.397    .000    .000    .000
 PeakP=1.000 SSS_FD_P=.000 TotF/RPwr=27138.713/103.141 FD_TP=.000
SIT3  , Fit=2.787 Conf=1.000 (22)
DumpEpoch bgproc @2E6E0 N=22 Avail=1 BestMatch=7 Conf=1.000
 Pwr =   .006    .008    .008    .002    .011    .010    .012    .026    .893    .019
 Sig =   .000    .000    .000    .000    .000    .000    .000   2.787    .000
```

TABLE A8

| Situation Running | Flag in Report | Meaning |
| --- | --- | --- |
| 1 | 1 | Dialtone |
| 1 | −1 | Ringtone |
| 1 | −2 | Busytone |
| 1 | −3 | SIT-1-LO |
| 1 | −4 | SIT-1-HI |
| 1 | −5 | SIT-2-LO |
| 1 | −6 | SIT-2-HI |
| 1 | −7 | SIT-3 |
| 1 | −8 | Voice |
| 1 | −19 | Timeout |
| 2 | 1 | Pickup |
| 2 | −FSMGBASE (−20) | Ring Failure |
| 2 | −1 | Dialtone |
| 2 | −2 | Busytone |
| 2 | −3 | Weird busy (cadence) |
| 2 | −4 | SIT IC |
| 2 | −5 | SIT NC-B |
| 2 | −6 | SIT NC-I |
| 2 | −7 | SIT RO-B |
| 2 | −8 | SIT RO-I |
| 2 | −9 | SIT VC |
| 2 | −19 | Timeout |

The above description is intended by way of example only, and is not intended to limit the present invention in any way, except as set forth in the following claims.

I claim:

1. A method for monitoring the progress of a phone call placed over the phone lines comprising the steps of:
    detecting audio signals on a phone line;
    determining a power spectrum of said audio signals periodically over a predetermined period of time, said power spectrum being defined by the presence of power at each of a predetermined number of select frequencies from the detected audio signals;
    determining the total power of said audio signals periodically over said predetermined period of time;
    providing a plurality of simple signal definitions corresponding to possible simple signals to be recognized each of which being defined by the presence of power at a unique combination of said predetermined number of select frequencies and the absence of power at a unique combination of said predetermined number of select frequencies;
    comparing the power spectrum with each of said simple signal definitions periodically over said predetermined period of time;
    identifying the possible simple signal from said plurality of simple signal definitions which most closely matches the power spectrum;
    storing data corresponding to the possible simple signal which most closely matches the power spectrum in a signal meld list at the end of said predetermined period of time
    storing the power of said audio data in a power meld list at the end of said predetermined period of time;
    accumulating data of matched signals in said signal meld list over time;
    accumulating data of the total power of said audio signals over time;
    providing a plurality of commands for examining said signal meld list and said power meld list for detecting select ones of possible simple signals for preset time durations or predetermined sequences of said possible simple signals, each for preset time durations;
    examining said signal meld list and said power meld list according to said commands periodically at said predetermined period of time;
    identifying which of said possible simple signals or predetermined sequence of possible simple signals match with the contents of said signal meld list and said power meld list in said preset durations; and
    reporting the possible simple signal or sequence of possible simple signals that match with the contents of said signal meld list and said power meld list.

2. The method of claim 1, and further comprising the step of timing out if none of said possible simple signals nor said predetermined sequence of possible simple signals matches the contents of said signal meld list and said power meld list after a preset time-out period of time.

3. The method of claim 1, and further comprising the step of providing a plurality of situation definitions, each situation definition comprising preset commands for examining said signal meld list and said power meld list for detecting select ones of said possible simple signals for preset time durations and select sequences of said possible signals for preset time durations, each situation definition being dedicated to detecting a particular one of said possible simple signals or a particular sequence of said possible simple signals.

4. The method of claim 1, wherein said step of determining a power spectrum further comprises the steps of:
    recursively evaluating the discrete fourier transform of said audio signals at said predetermined number of select frequencies;
    detecting voice energy by measuring the amount of power in said audio signals below 300 Hz;
    normalizing the values of power at said predetermined number of select frequencies and of said voice energy to unity;
    providing a normalized tone power vector having components corresponding to the normalized power at said predetermined number of select frequencies and said voice energy; and
    providing a normalized tone reference power quantity equal to the sum of the values of the power at each of said predetermined number of select frequencies and of said voice energy.

5. The method of claim 4, wherein said step of comparing said simple power spectrum with each of said signal definitions further comprises the steps of:
    comparing said normalized tone power vector with each of said simple signal definitions; and
    generating a signal fit vector having components indicating the measure of fit between the normalized tone power vector and each of said simple signal definitions.

6. The method of claim 5, wherein said step of identifying further comprises the steps of:
    examining the total power of said audio signals and declaring the possible signal as silence if said total power is less than a preset value;
    declaring the possible simple signal having the greatest measure of fit with said normalized tone power vector based upon said signal first vector, the best matched possible simple signal; and
    providing a measure of confidence in declaring said possible simple signal the best matched possible signal.

7. The method of claim 1, and further comprising the steps of:
    providing a plurality of complex pattern definitions, each complex pattern definition defining a complex pattern comprising a preset sequence and cadence of a plurality of possible simple signals;

providing a plurality of continuing pattern definitions, each continuing pattern definition defining a continuing pattern comprising predetermined transitions between at least two possible simple signals; and each of said situation definitions comprising signal commands for examining said signal meld list and said power meld list for detecting select ones of said possible simple signals, complex pattern commands for examining said signal meld list and said power meld list and detecting select ones of said complex patterns, continuing pattern commands for examining said signal meld list and said power meld list and detecting select ones of said continuing patterns.

8. The method of claim 7, and further comprising the steps of:

comparing the duration of each possible simple signal of a complex pattern found in said signal meld list with the corresponding possible simple signal of a complex pattern definition;

determining the matching time with a complex pattern definition by summing the amount of time that each possible simple signal found in said signal meld list overlaps with the corresponding possible simple signal of a complex pattern definition;

determining a measure of fit with a complex pattern definition by dividing the matching time by a total time duration of said complex patter definition;

issuing a match to a particular complex pattern if said measure of fit with said particular complex pattern exceeds a preset threshold value.

9. A method for monitoring the progress of a phone call placed over the phone lines comprising the steps of:

detecting audio signals on a phone line;

determining a power spectrum of said audio signals periodically over a predetermined period of time, said power spectrum being defined by the presence of power at each of a predetermined number of select frequencies from the detected audio signals;

determining the total power of said audio signals periodically over said predetermined period of time;

providing a plurality of possible simple signal definitions corresponding to possible simple signals to be recognized each of which being defined by the presence of power at a unique combination of said predetermined number of select frequencies and the absence of power at a unique combination of said predetermined number of select frequencies, said possible simple signals including silence, dial-tone, ringing, busy, voice, special information tones, and high energy at no particular frequency;

comparing the power spectrum with each of said possible simple signal definitions periodically over said predetermined period of time;

identifying the possible simple signal from said plurality of signal definitions which most closely matches the power spectrum;

storing data corresponding to the possible simple signal which most closely matches the power spectrum in a signal meld list at the end of said predetermined period of time;

storing the power of said audio data in a power meld list at the end of said predetermined period of time;

accumulating data of matched simple signals in said signal meld list over time;

accumulating data of the total power of said audio signals over time;

providing a plurality of complex pattern definitions, each complex pattern definition defining a complex pattern comprising a preset sequence and cadence of a plurality of possible simple signals;

providing a plurality of continuing pattern definitions, each continuing pattern definition defining a continuing pattern comprising predetermined transitions between at least two possible simple signals;

providing a plurality of situation definitions, each situation definition comprising signal commands for examining said signal meld list and said power meld list for detecting select ones of said possible simple signals, complex pattern commands for examining said signal meld list and said power meld list and detecting select ones of said complex patterns, continuing pattern commands for examining said signal meld list and said power meld list and detecting select ones of said continuing patterns, each situation definition being dedicated to detecting the presence of a particular one of said possible simple signals, a particular one of said complex patterns, or a particular one of said continuing patterns;

issuing a Situation Recognize Command specifying a particular situation definition dedicated for detecting a particular one of said possible simple signals, a particular one of said complex patterns, or a particular one of said continuing patterns;

examining said signal meld list and said power meld list according to said particular situation definition periodically at said predetermined period of time;

identifying which of said possible simple signals, said complex patterns, and said continuing patterns match with the contents of said signal meld list and said power meld list; and reporting the possible simple signal, the complex pattern, or the continuing pattern that matches with the contents of said signal meld list and said power meld list.

10. The method of claim 9, and wherein said step of reporting issues a flag unique to each possible simple signal, complex pattern or continuing pattern.

11. The method of claim 9, wherein said step of providing a plurality of continuing pattern definitions comprises the step of defining a ringing continuing pattern as the infinite repeating transition between a ringing signal for a preset duration and silence for a preset duration, and a noisy ringing continuing pattern as the infinite repeating transition between a high energy signal of no particular frequency for a preset duration and silence for a preset duration, and wherein said step of providing a plurality of situation definitions further comprises the step of providing a termination ringing command for examining said signal meld list and said power meld list for detecting a deviation from said ringing continuing pattern and said noisy ringing continuing pattern, and wherein said step of reporting further comprises the step of reporting each occurrence of said ringing signal for said preset duration or said high energy signal for said preset duration and reporting the termination of said ringing continuing pattern or said noisy ringing continuing pattern.

12. The method of claim 9, and further comprising the step of timing out if none of said possible simple signals, none of said complex patterns, or none of said continuing patterns matches the contents of said signal meld list and said power meld list after a preset time-out period of time.

13. The method of claim 10, and further comprising the step of placing said phone line off-hook, and wherein said step of issuing a Situation Recognize Command comprises the step of issuing a first particular Situation Recognize Command specifying the recognition of dialtone signal and including a signal command for examining said signal meld list to detect said dialtone signal, said busy signal, said ringing signal, and said special information tones, said step of reporting reports the match of dialtone upon detecting said dialtone signal, and said step of issuing a flag issues a flag upon detecting said busy signal, said ringing signal, or said special information tones.

14. The method of claim 13, and further comprising the step of dialing a telephone number on said phone line if said step of reporting reports a match to dialtone;
said step of issuing a Situation Recognize Command further comprises the step of issuing a second particular Situation Recognize Command if said step of reporting reports that a match to dialtone has occurred;
said step of providing complex pattern definitions comprises the step of defining special information complex patterns comprising preset sequences of said special information tones, said special information complex patterns being indicative of special information signals in said audio data, said step of providing continuing pattern definitions comprises the step of defining ringing, noisy ringing, and pickup continuing patterns, said ringing continuing pattern being defined by repeating transitions between said ringing signal at a preset frequency for a preset duration to silence for a preset duration, said noisy ringing continuing pattern being defined by repeating transitions between said high energy signal at no particular frequency for a preset duration and silence for a preset duration, said pickup continuing pattern being defined by said voice signal for a preset duration followed by silence for a preset duration;
said second particular Situation Recognize Command specifying the recognition o pickup of said phone line and including signal commands for detecting said dialtone and said busy signals, complex pattern commands for detecting each of said special information complex patterns, and continuing pattern commands for detecting each of said ringing, noisy ringing, and pickup, continuing patterns;
said step of declaring declares a success upon detecting said pickup continuing pattern; and
said step of issuing a flag issues a flag upon detecting any of said special information complex patterns, said busy signal, said dialtone signal, or the absence of said ringing or noisy ringing continuing patterns.

15. The method of claim 14, wherein said step of issuing a flag specifies an identity of the possible simple signal, the complex pattern, or the continuing pattern.

16. The method of claim 15, and further comprising the step of redialing said telephone number upon receiving a flag indicating that a busy signal is detected.

17. The method of claim 13, wherein said step of issuing a flag specifies an identity of the possible simple signal, the complex pattern, or the continuing pattern.

18. The method of claim 17, and further comprising the step of again placing said phone line off-hook if said step of issuing a flag issues a flag specifying the presence of a busy signal, ringing signal or special information tone.

19. The method of claim 17, and further comprising the step of checking the operation of the phone line if said step of issuing a failure flag issues a failure flag specifying the presence of a busy signal, ringing signal, or special information tone.

20. The method of claim 9, and further comprising the steps of:
comparing the duration of each possible simple signal of a complex pattern found in said signal meld list with the corresponding possible signal of a complex pattern definition;
determining the matching time with a complex pattern definition by summing the amount of time that each possible simple signal found in said signal meld list overlaps with the corresponding possible simple signal of a complex pattern;
determining a measure of fit with a complex pattern definition by dividing the matching time by a total time duration of said complex pattern definition; and
issuing a match to a particular complex pattern when said measure of fit with said particular complex pattern exceeds a preset threshold value.

21. The method of claim 9, and further comprising the steps of:
comparing the duration of each possible simple signal of a complex pattern found in said signal meld list with the corresponding possible simple signal of a complex pattern definition;
determining the deviation time with a complex pattern definition by summing the amount of time that each possible simple signal found in said signal meld list does not overlap with the corresponding possible simple signal of complex pattern;
determining a measure of fit with a complex pattern definition by dividing the deviation time by a total time duration of said complex pattern definition;
determining the measure of nonfit by subtracting the measure of fit from unity;
issuing a nonmatch to a particular complex pattern when said measure of fit with said particular complex pattern exceeds a preset threshold value.

22. The method of claim 9, wherein said step of determining a power spectrum further comprises the steps of:
recursively evaluating the discrete fourier transform of said audio signals at said predetermined number of select frequencies;
detecting voice energy by measuring the amount of power in said audio signals below 300 Hz;
normalizing the values of power at said predetermined number of select frequencies and of said voice energy to unity;
providing a normalized tone power vector having components corresponding to the normalized power at said predetermined number of select frequencies and said voice energy; and
providing a normalized tone reference power quantity equal to the sum of the values of the power at each of said predetermined number of select frequencies and of said voice energy.

23. The method of claim 22, wherein said step of comparing said power spectrum with each of said signal definitions further comprises the steps of:
comparing said normalized tone power vector with each of said signal definitions; an
generating a signal fit vector having components indicating the measure of fit between the normalized tone power vector and each o said signal definitions.

24. The method of claim 22, wherein said step of identifying further comprises the steps of:
- examining the total power of said audio signals and declaring the possible simple signal silence if said total power is less than a preset value;
- declaring the possible simple signal having the greatest measure of fit with said normalized tone power vector based upon said signal fit vector, the best matched possible signal; and
- providing a measure of confidence in declaring said possible simple signal the best matched possible signal.

25. A system for monitoring the progress of a phone call placed by a host or other automated device, the system comprising:
- a host for placing a phone call over the phone lines and issuing a Recognize Situation Command specifying a particular situation to be detected;
- call progress monitor means responsive to said Recognize Situation Command and generating a Recognize Command Termination Report; and
- means for communicating said Recognize Situation Command from said host to said call progress monitor means and for communicating said Recognize Command Termination Report from said call progress monitor means to said host;
- said call progress monitor means:
  - detecting audio signals on a phone line, determining a power spectrum of said audio signals periodically over a predetermined period of time, said power spectrum being defined by the presence of power at each of a predetermined number of select frequencies from the detected audio signals
  - determining the total power of said audio signals periodically over said predetermined period of time;
  - providing a plurality of signal definitions corresponding to possible signals to be recognized each of which being defined by the presence of power at a unique combination of said predetermined number of select frequencies and the absence of power at unique combination of said predetermined number of select frequencies;
  - comparing the power spectrum with each of said signal definitions periodically over said predetermined period of time;
  - identifying the possible signal from said plurality of signal definitions which most closely matches the power spectrum;
  - storing data corresponding to the possible signal which most closely matches the power spectrum in a signal meld list at the end of said predetermined period of time;
  - storing the power of said audio data in a power meld list at the end of said predetermined period of time;
  - accumulating data of matched signals in said signal meld list over time;
  - accumulating data of the total power of said audio signals over time;
  - providing a plurality of situation definitions, each situation definition comprising commands for examining said signal meld list and said power meld list for detecting select ones of said possible signals, each situation definition dedicated to detecting the presence of a particular one or ones of said possible signals in said audio data in preset patterns or for preset time durations;
  - examining said signal meld list and said power meld list periodically at said predetermined period of time according to said particular situation specified in said Recognize Situation Command which corresponds to a particular situation definition;
  - identifying which of said possible signals or preset patterns of possible signals match with the contents of said signal meld list and said power meld list; and
  - reporting to the host the possible signal or preset pattern of possible signals that match with the contents of said signal meld list and said power meld list in said Recognize Command Termination Report.

26. The system of claim 25, wherein said call progress monitor means times-out if none of said possible simple signals nor said predetermined sequence of possible simple signals matches the contents of said signal meld list and said power meld list after a preset time-out period of time.

27. The system of claim 25, wherein said call progress monitor means further:
- provides a plurality of complex pattern definitions, each complex pattern definition defining a complex pattern comprising a preset sequence and cadence of a plurality of possible signals;
- provides a plurality of continuing pattern definitions, each continuing pattern definition defining a continuing pattern comprising predetermined transitions between at least two possible signals; and
- each of said situation definitions comprising signal commands for examining said signal meld list and said power meld list for detecting select ones of said possible signals, complex pattern commands for examining said signal meld list and said power meld list and detecting select ones of said complex patterns, continuing pattern commands for examining said signal meld list and said power meld list and detecting select ones of said continuing patterns.

28. A method for monitoring the progress of a phone call placed by a host over the phone lines, the method comprising the steps of:
- detecting audio signals on a phone line;
- determining a power spectrum of said audio signals periodically over a predetermined period of time, said power spectrum being defined by the presence of power at each of a predetermined number of select frequencies from the detected audio signals;
- determining the total power of said audio signals periodically over said predetermined period of time;
- providing a plurality of signal definitions corresponding to possible signals to be recognized each of which being defined by the presence of power at a unique combination of said predetermined number of select frequencies and the absence of power at a unique combination of said predetermined number of select frequencies, said possible signals including a dialtone signal, a pickup signal, and voice signals;
- comparing the power spectrum with each of said signal definitions periodically over said predetermined period of time;

identifying the possible signal from said plurality of signal definitions which most closely matches the power spectrum;

storing data corresponding to the possible signal which most closely matches the power spectrum in a signal meld list at the end of said predetermined period of time;

storing the power of said audio data in a power meld list at the end of said predetermined period of time;

accumulating data of matched signals in said signal meld list over time;

accumulating data of the total power of said audio signals over time;

providing a plurality of situation definitions, each situation definition comprising commands for examining said signal meld list and said power meld list for detecting select ones of said possible signals, each situation definition dedicated to detecting the presence of a particular one or ones of said possible signals in said audio data in preset patterns or for preset time durations;

placing the phone line off hook;

issuing a Recognize Situation Command specifying the recognition of the presence of a dialtone signal for a preset time duration on the phone line after the host has placed the phone line off hook;

examining said signal meld list periodically at said predetermined period of time;

reporting that dialtone is detected as soon as the dialtone signal is detected for said preset time duration and dialing the telephone number to be called;

reporting that a signal other than dialtone is detected as soon as one of said possible signals other than dialtone is detected;

dialing a telephone number on said phone line if a dialtone signal is reported;

issuing a Recognize Situation Command specifying the recognition of the presence of a pickup signal on the phone line and voice signals subsequent to the pickup signal if a dialtone signal is reported;

examining the signal meld list and the power meld list periodically at said predetermined period of time;

reporting that pickup occurred as soon as the pickup and voice signals are detected; and reporting that one of said possible signals other than pickup and voice is detected a preset period of time subsequent to dialing the telephone number.

29. A system for monitoring the progress of a phone call placed by a host over the phone lines comprising:
a host for placing a phone call over the phone lines and issuing a Recognize Situation Command specifying a particular situation to be detected;

call progress monitor means connected to said host and responsive to said Recognize Situation Command and generating a Recognize Command Termination Report; and means for communicating said Recognize Situation Command from said host to said call progress monitor means and for communicating said Recognize Command Termination Report from said call progress monitor means to said host;

said call progress monitor means:
detecting audio signals on a phone line;
determining a power spectrum of said audio signals periodically over a predetermined period of time, said power spectrum being defined by the presence of power at each of a predetermined number of select frequencies from the detected audio signals;

determining the total power of said audio signals periodically over said predetermined period of time;

providing a plurality of possible simple signal definitions corresponding to possible simple signals to be recognized each of which being defined by the presence of power at a unique combination of said predetermined number of select frequencies and the absence of power at a unique combination of said predetermined number of select frequencies, said possible simple signals including silence, dialtone, ringing, busy, voice, special information tones, and high energy at no particular frequency;

comparing the power spectrum with each of said signal definitions periodically over said predetermined period of time;

identifying the possible simple signal from said plurality of signal definitions which most closely matches the power spectrum;

storing data corresponding to the possible simple signal which most closely matches the power spectrum in a signal meld list at the end of said predetermined period of time;

storing the power of said audio data in a power meld list at the end of said predetermined period of time;

accumulating data of matched simple signals in said signal meld list over time;

accumulating data of the total power of said audio signals over time;

providing a plurality of complex pattern definitions, each complex pattern definition defining a complex pattern comprising a preset sequence and cadence of a plurality of possible simple signals;

providing a plurality of continuing pattern definitions, each continuing pattern definition defining a continuing pattern comprising predetermined transitions between at least two possible simple signals;

providing a plurality of situation definitions, each situation definition comprising signal commands for examining said signal meld list and said power meld list for detecting select ones of said possible simple signals, complex pattern commands for examining said signal meld list and said power meld list and detecting select ones of said complex patterns, continuing pattern commands for examining said signal meld list and said power meld list and detecting select ones of said continuing patterns, each situation definition being dedicated to detecting the presence of a particular one of said possible simple signals, a particular one of said complex patterns, or a particular one of said continuing patterns;

issuing a Situation Recognize Command specifying a particular situation definition dedicated for detecting a particular one of said possible simple signals, a particular one of said complex patterns, or a particular one of said continuing patterns;

examining said signal meld list and said power meld list according to said particular situation definition periodically at said predetermined period of time; and reporting in said Recognize Command Termination Report when the particular one of said possible simple signals, the particular one of said complex patterns, or the particular one of said continuing patterns, corresponding to a particular situation definition, is detected.

30. A method for monitoring the progress of a phone call placed over the phone lines comprising the steps of:
   detecting audio signals on a phone line;
   determining a power spectrum of said audio signals periodically over a predetermined period of time, said power spectrum being defined by the presence of power at each of a predetermined number of select frequencies from the detected audio signals;
   determining the total power of said audio signals periodically over said predetermined period of time;
   providing a plurality of possible simple signal definitions corresponding to possible simple signals to be recognized each of which being defined by the presence of power at a unique combination of said predetermined number of select frequencies and the absence of power at a unique combination of said predetermined number of select frequencies;
   comparing the power spectrum with each of said signal definitions periodically over said predetermined period of time;
   identifying the possible simple signal from said plurality of signal definitions which most closely matches the power spectrum;
   storing data corresponding to the possible simple signal which most closely matches the power spectrum in a signal meld list at the end of said predetermined period of time;
   storing the power of said audio data in a power meld list at the end of said predetermined period of time;
   accumulating data of matched simple signals in said signal meld list over time;
   accumulating data of the total power of said audio signals over time;
   providing a plurality of situation definitions, each situation definition comprising signal commands for examining said signal meld list and said power meld list for detecting select ones of said possible simple signals in predetermined sequences, each situation definition being dedicated to detecting the presence of a particular one or ones of said possible signals in said predetermined sequences;
   issuing a Situation Recognize Command specifying a particular situation definition dedicated for detecting a particular one or ones of said possible simple signals;
   examining said signal meld list and said power meld list according to said particular situation definition periodically at said predetermined period of time; and
   reporting that the particular one or ones of said possible simple signals is detected and the identity of the possible simple signals other than said particular one or ones of said possible simple signals are detected if the particular one or ones of said possible simple signals are not detected.

31. The method of claim 30, wherein said step of providing a plurality of possible simple signal definitions comprises providing definitions corresponding to DTMF and MF signals.

32. The method of claim 30, and further comprising the steps of:
   providing a plurality of complex pattern definitions, each complex pattern definition defining a complex pattern comprising a preset sequence and cadence of a plurality of possible simple signals;
   providing a plurality of continuing pattern definitions, each continuing pattern definition defining a continuing pattern comprising predetermined transitions between at least two possible simple signals;
   said step of providing plurality of situation definitions further comprises the steps of providing for each situation definition, complex pattern commands for examining said signal meld list and said power meld list and detecting select ones of said complex patterns, continuing pattern commands for examining said signal meld list and said power meld list and detecting select ones of said continuing patterns, each of said situation definitions being further dedicated to detecting the presence of a particular one of said complex patterns or a particular one of said continuing patterns;
   said step of issuing a Recognize Situation Command further comprises the step of specifying a particular one of said continuing patterns or a particular one of said complex patterns; and
   said step of reporting reports that the particular one or ones of said possible simple signals, the particular one of said complex patterns or the particular one of said continuing patterns are detected, and the identity of the complex pattern other than said particular complex pattern detected, the identity of the continuing pattern other than said particular continuing pattern detected, if a complex pattern other than said particular complex pattern is detected or a continuing pattern other than said particular continuing pattern is detected.

33. A system for monitoring the progress of a phone call placed by a host over the phone lines comprising:
   at least one phone line for supporting telephone communication;
   a host for placing a phone call over said phone line and issuing a Recognize Situation Command specifying a particular situation to be detected, said host including means for dialing a phone number;
   call progress monitor means responsive to said Recognize Situation Command and generating a Recognize Command Termination Report;
   means for communicating s id Recognize Situation Command from said host to said call progress monitor means and for communicating said Recognize Command Termination Report from said call progress monitor means to said host; and
   means for placing said phone line off hook in attempt to receive a dialtone on said phone line;
   said call progress monitor means:
      detecting audio signals on said phone line;
      determining a power spectrum of said audio signals periodically over a predetermined period of time, said power spectrum being defined by the presence of power at each of a predetermined number of select frequencies from the detected audio signals;
      determining the total power of said audio signals periodically over said predetermined period of time;
      providing a plurality of signal definitions corresponding to possible signals to be recognized each of which being defined by the presence of power at a unique combination of said predetermined number of select frequencies and the absence of power at a unique combination of said predetermined number of select frequencies, said possible signals including a dialtone signal, a pickup signal, and voice signals; comparing the power spectrum with each of said signal definitions periodically over said predetermined period of time;

identifying the possible signal from said plurality of signal definitions which most closely matches the power spectrum;

storing data corresponding to the possible signal which most closely matches the power spectrum in a signal meld list at the end of said predetermined period of time;

storing the power of said audio data in a power meld list at the end of said predetermined period of time;

accumulating data of matched signals in said signal meld list over time;

accumulating data of the total power of said audio signals over time;

providing a plurality of situation definitions, each situation definition comprising commands for examining said signal meld list and said power meld list for detecting select ones of said possible signals each situation definition dedicated to detecting the presence of a particular one or ones of said possible signals in s id audio data in preset patterns or for preset time durations;

said host activating said means for placing the phone line off hook and issuing a Recognize Situation Command specifying the recognition of the presence of a dialtone signal for preset time duration on the phone line after the host has placed the phone line off hook;

said call progress monitor means examining said signal meld list periodically at said predetermined period of time and reporting that dialtone is present as soon as the dialtone signal is detected for said preset time duration and dialing the telephone number to be called, or reporting the identity of the possible signal other than dialtone that is detected;

said host activating said means for dialing a telephone number on said phone line if a dialtone signal is reported in said Recognize Command Termination Report and issuing a Recognize Situation Command specifying the recognition of pickup of the phone line if a dialtone signal is reported;

said call progress monitor means examining the signal meld list and the power meld list periodically at said predetermined period of time and reporting in said Recognize Command Termination Report that pickup is detected as soon as pickup is detected, or reporting that one of said possible signals other than pickup is detected a preset period of time subsequent to dialing the telephone number.

34. A method for monitoring the progress of a phone call placed over the phone lines comprising the steps of:

detecting digital data representative of telephone audio signals on each channel of a multiple channel digital phone line;

determining a power spectrum of said audio signals on each of said channels periodically over a predetermined period of time, said power spectrum being defined by the presence of power at each of a predetermined number of select frequencies from the detected audio signals;

determining the total power of said audio signals on each of said channels periodically over said predetermined period of time;

providing a plurality of possible simple signal definitions corresponding to possible simple signals to be recognized each of which being defined by the presence of power at a unique combination of said predetermined number of select frequencies and the absence of power at a unique combination of said predetermined number of select frequencies, said possible simple signals including silence, dialtone, ringing, busy, voice, special information tones, and high energy at no particular frequency;

comparing the power spectrum with each of said signal definitions on each of said channels periodically over said predetermined period of time;

identifying the possible simple signal from said plurality of signal definitions which most closely matches the power spectrum on each of said channels;

storing data corresponding to the possible simple signal which most closely matches the power spectrum in signal meld list at the end of said predetermined period of time for each of said channels;

storing the power of said audio data in a power meld list at the end of said predetermined period of time for each of said channels;

accumulating data of matched simple signals in said signal meld list over time for each of said channels;

accumulating data of the total power of said audio signals over time for each of said channels;

providing a plurality of complex pattern definitions, each complex pattern definition defining a complex pattern comprising a preset sequence and cadence of a plurality of possible simple signals;

providing a plurality of continuing pattern definitions, each continuing pattern definition defining a continuing pattern comprising predetermined transitions between at least two possible simple signals;

providing a plurality of situation definitions, each situation definition comprising signal commands for examining said signal meld list and said power meld list for detecting select ones of said possible simple signals, complex pattern commands for examining said signal meld list and said power meld list and detecting select ones of said complex patterns, continuing pattern commands for examining said signal meld list and said power meld list and detecting select ones of said continuing patterns, each situation definition being dedicated to detecting the presence of a particular one of said possible simple signals, a particular one of said complex patterns, or a particular one of said continuing patterns;

issuing a Situation Recognize Command specifying a particular situation definition dedicated for detecting a particular one of said possible simple signals, a particular one of said complex patterns, or a particular one of said continuing patterns;

examining said signal meld list and said power meld list according to said particular situation definition periodically at said predetermined period of time;

identifying which of said possible simple signals, said complex patterns, and said continuing patterns match with the contents of said signal meld list and said power meld list; and reporting the possible simple signal, the complex pattern, or the continuing pattern that matches with the contents of said signal meld list and said power meld list.

35. The method of claim 34, wherein said step of providing a plurality of continuing pattern definitions comprises the step of defining a ringing continuing pattern as the infinite transition between a ringing signal for a preset duration and silence for a preset duration, and a noisy ringing continuing pattern as the infinite transition between a high energy signal of no particular frequency for a preset duration and silence for a preset duration.

36. The method of claim 35, wherein said step of providing a plurality of situation definitions further comprises the step of providing a termination ringing command for examining said signal meld list and said power meld list for detecting a deviation from said ringing continuing pattern and said noisy ringing continuing pattern, and wherein said step of reporting further comprises the step of reporting each occurrence of said ringing signal for said preset duration or said high energy signal for said preset duration and reporting the termination of said ringing continuing pattern or said noisy ringing continuing pattern.

37. The method of claim 35, wherein said step of providing a plurality of continuing pattern definitions comprises the step defining a pickup continuing pattern as the transition from a voice signal for a preset duration to silence for a preset duration.

* * * * *